(12) United States Patent
Pham

(10) Patent No.: US 6,839,729 B2
(45) Date of Patent: *Jan. 4, 2005

(54) METHOD AND APPARATUS FOR A MULTI-PURPOSE DOMINO ADDER

(75) Inventor: Giao N. Pham, Portland, OR (US)

(73) Assignee: Intel Corporation, Santa Clara, CA (US)

(*) Notice: Subject to any disclaimer, the term of this patent is extended or adjusted under 35 U.S.C. 154(b) by 602 days.

This patent is subject to a terminal disclaimer.

(21) Appl. No.: 09/968,408

(22) Filed: Sep. 28, 2001

(65) Prior Publication Data
US 2003/0084084 A1 May 1, 2003

(51) Int. Cl.[7] .................................................. G06F 7/50
(52) U.S. Cl. ........................................ 708/710; 708/714
(58) Field of Search .............................. 708/710, 711, 708/712, 713, 714

(56) References Cited

U.S. PATENT DOCUMENTS 5,701,504 A * 12/1997 Timko ........................ 708/710
5,719,803 A * 2/1998 Naffziger .................... 708/710
5,905,667 A * 5/1999 Lee ............................ 708/700
6,003,059 A * 12/1999 Bechade ..................... 708/714

* cited by examiner

Primary Examiner—Chuong Dinh Ngo
(74) Attorney, Agent, or Firm—Blakely, Sokoloff, Taylor & Zafman LLP

(57) ABSTRACT

A method and apparatus for a multi-purpose adder is described. The method includes calculation of an initial sum for each corresponding N-bit portion of a received addend signal and a received augend signal. Generation of an initial carryout signal for each calculated initial sum is then performed. Next, an intermediate sum for each group of M-initial sums according to a respective initial carryout value of each initial sum is then generated. Once generated, an intermediate carryout value for each generated intermediate sum is then calculated. Finally, a final sum is calculated from the intermediate sums generated according to a respective intermediate carryout of each intermediate sum.

31 Claims, 21 Drawing Sheets

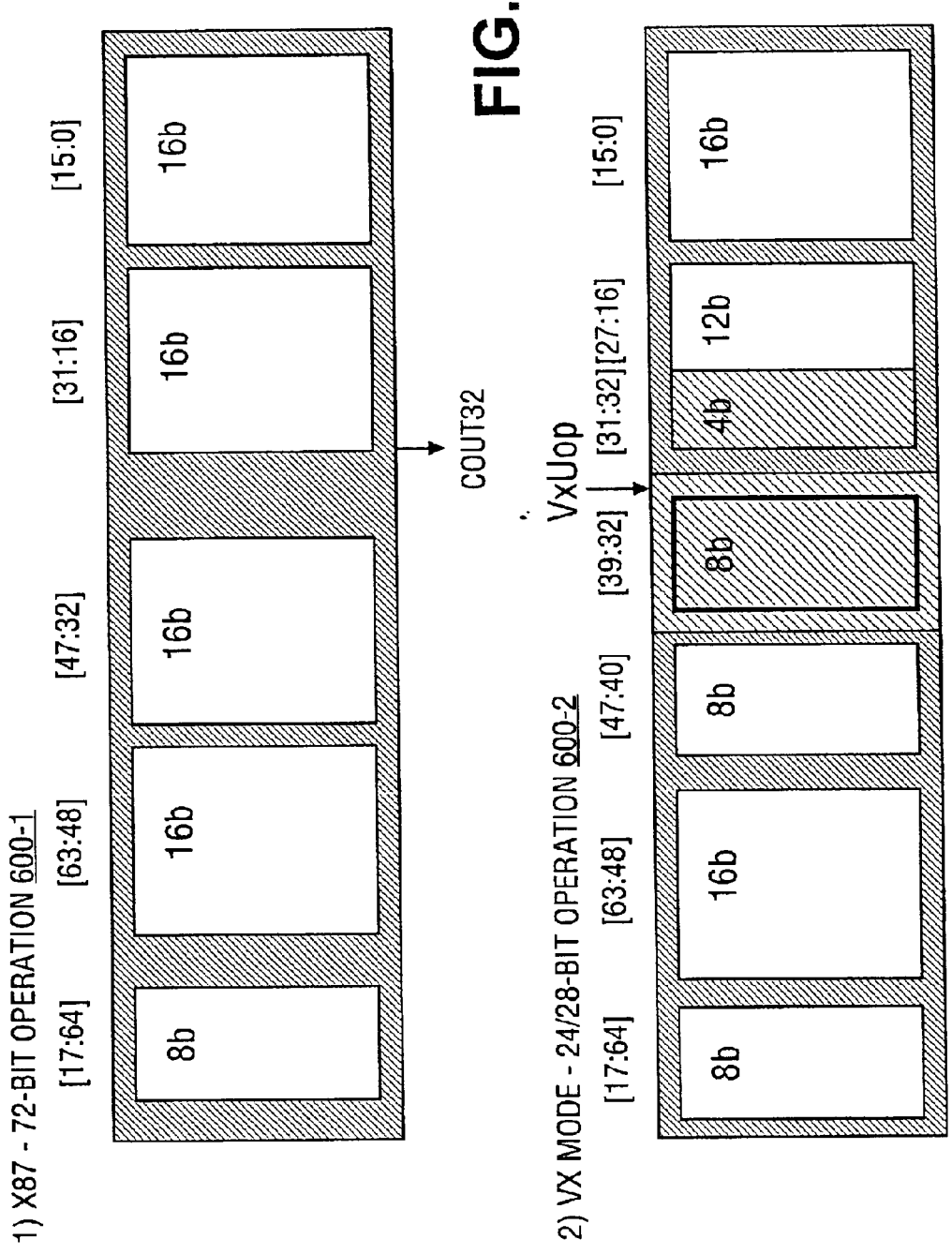

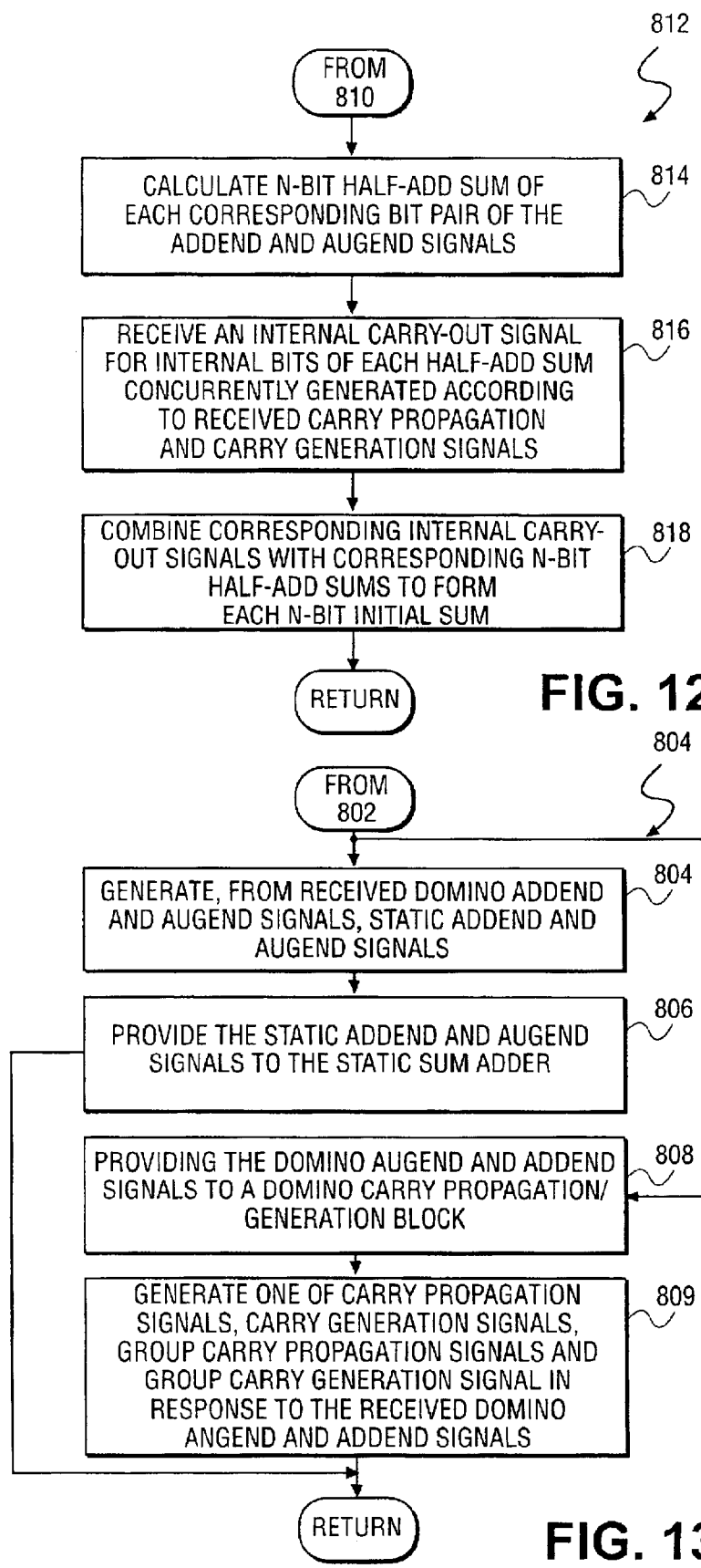

METHOD AND APPARATUS FOR A MULTI-PURPOSE DOMINO ADDER

FIELD OF THE INVENTION

The present invention relates generally to the field of adders. In particular, the present invention relates to an apparatus and method for a multi-purpose domino adder.

BACKGROUND OF THE INVENTION

One of the basic functions to the operation of virtually all computer systems is the capability of adding two integers together. Having an addition function is essential because not only is addition used to provide numerical sums to users, but it is also used in the implementation of numerous logic functions internal to the computer system. Hence, one or more adders are typically found in the arithmetic logic unit of a computer's microprocessor.

As such, when two bits are added together, the result is a sum of those two bits plus a carry to the next (i.e., leftward) position. Thus, the addition of multiple bits can be effectuated by using the carry-out of one set of bits as the carry into the neighboring set of bits on its left. For example, the binary addition of the two bits "11" and "01" is performed by first adding together the two least significant bits "1" and "1." The result is a sum of "0" with a carry-out bit of "1." The carry-out bit is factored as a carry bit to the addition of the next set of bits, "0" and "1." The result is a sum of "0" with a carry-out of "1." This yields a final correct answer of "100" (i.e., 3+1=4).

As known to those skilled in the art, this type of adder is known as a ripple carry adder because the addition function involves rippling the carry, which can be either a 1 or a 0, all the way from the rightmost bit to the leftmost bit. One problem, however, associated with ripple carry and other similar types of adders is that it takes time to ripple the carry signal. In some cases, two levels of logic are implemented in computing the carry-out from a carry-in. Hence, if the least significant bit generates a carry which is propagated through the length of the adder, the signal passes through 2n levels of logic before the last gate can determine whether there is a carry-out of the most significant place.

In general, the time a circuit takes to produce an output is proportional to the maximum number of logic levels through which the signal travels. This propagation delay is specially severe for cases involving the addition of large numbers having multiple bits. For example, a substantial amount of time is required to ripple the carry through the entire addition chain of two 32-bit words. Consequently, the time required to ripple the carry retards the critical time path, thereby slowing down the overall speed of the microprocessor. This detrimentally impacts the performance of the computer system.

Consequently, there are numerous prior art adder designs aimed at minimizing the time required to perform binary addition. One approach involves the manipulation of multiple bits in parallel to speed up the addition process. In a design known as carry look-ahead, the inputs to a number of stages are examined, while simultaneously, the proper carry for each of these stages is being calculated. Each carry is then applied to the adder corresponding to the appropriate bit. In a conditional-sum arrangement, a sum both with a carry set to "0" and a carry set to "1" are generated for each order. A selection of one of the two sums is made based on carry information originating from the lower orders.

Other various hybrid arrangements utilizing combinations of the parallel and propagate carries have been proposed to reduce the inherent time delay. The goal is to further minimize the critical time path. As a result, the trend is for ever more powerful and faster computers, there is a need in the prior art for even faster adders. It would be highly preferable for such an adder to have a regular, hierarchical structure suitable for performing the addition of large numbers. Furthermore, it would also be preferable for the delay of such an adder to scale up logarithmically with an increase in the number of bits to be added.

Moreover, floating point operation is one of the essential tasks repeatedly performed by many digital data processors. As a result, the floating point unit (FPU) is an essential part of a digital data processor. Much effort has been expanded to try to maximize the speed of FPUs, nevertheless, any further improvement on the speed of FPUs is still desirable. During floating point operations, it is often necessary to determine the amount of right shift for a mantissa of a floating point number. The amount of right shift is equal to the difference between the exponents of the two floating point input operands.

Thus, it is often necessary to perform a rapid addition/subtraction operation, and then followed by a shifting operation. Conventional FPU typically includes an adder to perform the addition/subtraction operation, and a separate barrel shifter to perform the shifting operation. Conventional FPU typically also attempts to maximize the performance of the FPU by maximizing the performance of the individual components. Thus, typically a high speed parallel adder and any one of a number of high speed barrel shifter would be employed.

This conventional approach suffers from at least one disadvantage in that high speed parallel adders typically achieve their improvement in performance by focusing on the critical paths. As a result, the generation speed for the lower sum bits are sacrificed in favor of the generation speed of the higher order sum bits that are on the critical paths. Since the shifting operation serially depends on the output sum bits of the adder, the conventional approach actually leads to less than optimal combined performance for the addition and shifting operations when viewed in totality.

Therefore, there remains a need to overcome one or more of the limitations in the above-described, existing art.

BRIEF DESCRIPTION OF THE DRAWINGS

The features, aspects, and advantages of the present invention will become more fully apparent from the following Detailed Description and appended claims when taken in conjunction with accompanying drawings in which:

FIGS. 9A through 9C depict block diagrams illustrating operational modes of the domino adder as depicted in FIG. 8.

FIG. 12 depicts a flowchart illustrating an additional method for calculating initial sums within a multi-purpose domino adder in accordance with a further embodiment of the present invention.

FIG. 13 depicts a flowchart illustrating an additional method for forming a response to receiving addend and augend signals in accordance with a further embodiment of the present invention.

DETAILED DESCRIPTION

Figure 1:
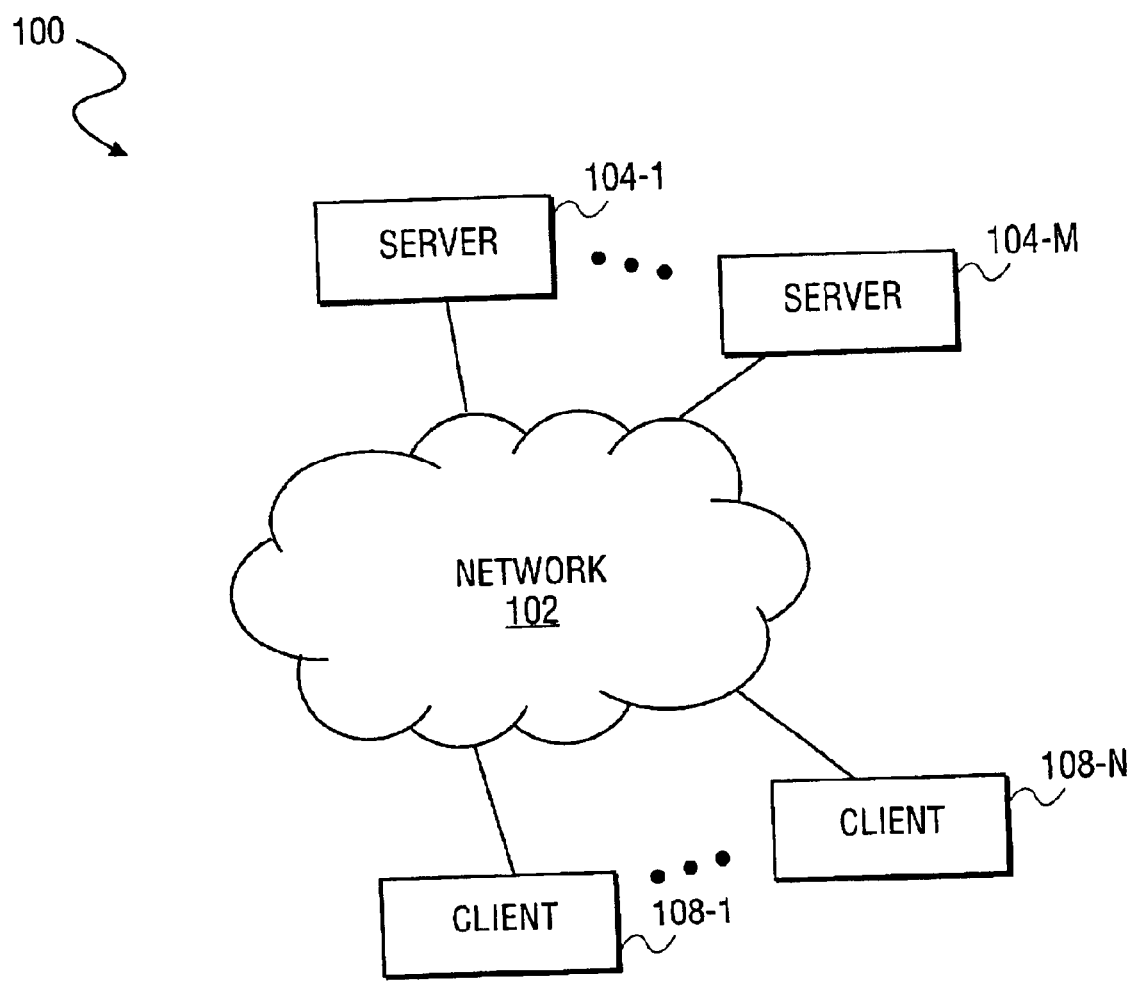
FIG. 1 depicts a block diagram illustrating a network computer environment as known in the art.

A method and apparatus for a multi-purpose domino adder are described. The method includes calculation of an initial sum for each corresponding N-bit portion of a received addend signal and a received augend signal. Generation of an initial carryout signal for each calculated initial sum is then performed. Next, an intermediate sum for each group of M-initial sums according to a respective initial carryout value of each initial sum is then generated. Once generated, an intermediate carryout value for each generated intermediate sum is then calculated. Finally, a final sum is calculated from the intermediate sums generated according to a respective intermediate carryout of each intermediate sum.

In the following description, for the purposes of explanation, numerous specific details are set forth in order to provide a thorough understanding of the present invention. It will be apparent, however, to one skilled in the art that the present invention may be practiced without some of these specific details. For example, various signals, layout patterns, memory cell configurations and circuits, and logic circuits may be modified according to the teachings of the present invention.

In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

Portions of the following detailed description may be presented in terms of algorithms and symbolic representations of operations on data bits. These algorithmic descriptions and representations are used by those skilled in the data processing arts to convey the substance of their work to others skilled in the art. An algorithm, as described herein, refers to a self-consistent sequence of acts leading to a desired result. The acts are those requiring physical manipulations of physical quantities. These quantities may take the form of electrical or magnetic signals capable of being stored, transferred, combined, compared, and otherwise manipulated. Moreover, principally for reasons of common usage, these signals are referred to as bits, values, elements, symbols, characters, terms, numbers, or the like.

However, these and similar terms are to be associated with the appropriate physical quantities and are merely convenient labels applied to these quantities. Unless specifically stated otherwise, it is appreciated that discussions utilizing terms such as "processing" or "computing" or "calculating" or "determining" or displaying" or the like, refer to the action and processes of a computer system, or similar electronic computing device, that manipulates and transforms data represented as physical (electronic) quantities within the computer system's devices into other data similarly represented as physical quantities within the computer system devices such as memories, registers or other such information storage, transmission, display devices, or the like.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software.

One of skill in the art will immediately appreciate that the invention can be practiced with computer system configurations other than those described below, including handheld devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. The required structure for a variety of these systems will appear from the description below.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

In one embodiment, the present invention may be provided as a computer program product which may include a machine or computer-readable medium having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

System

Referring now to FIG. 1, FIG. 1 depicts a network environment 100 in which the techniques of the present invention may be implemented. As shown, the network environment includes several computer systems such as a plurality of servers 104 (104-1, . . . , 104-M) and a plurality of clients 108 (108-1, . . . , 108-N), connected to each other via a network 102. The network 102 may be, for example, the Internet. Note that alternatively the network 102 might be or include one or more of: a Local Area Network (LAN), Wide Area Network (WAN), satellite link, fiber network, cable network, or a combination of these and/or others. The method and apparatus described herein may be applied to essentially any type of communicating means or device whether local or remote, such as a LAN, a WAN, a system bus, a disk drive, storage, etc.

Figure 2:
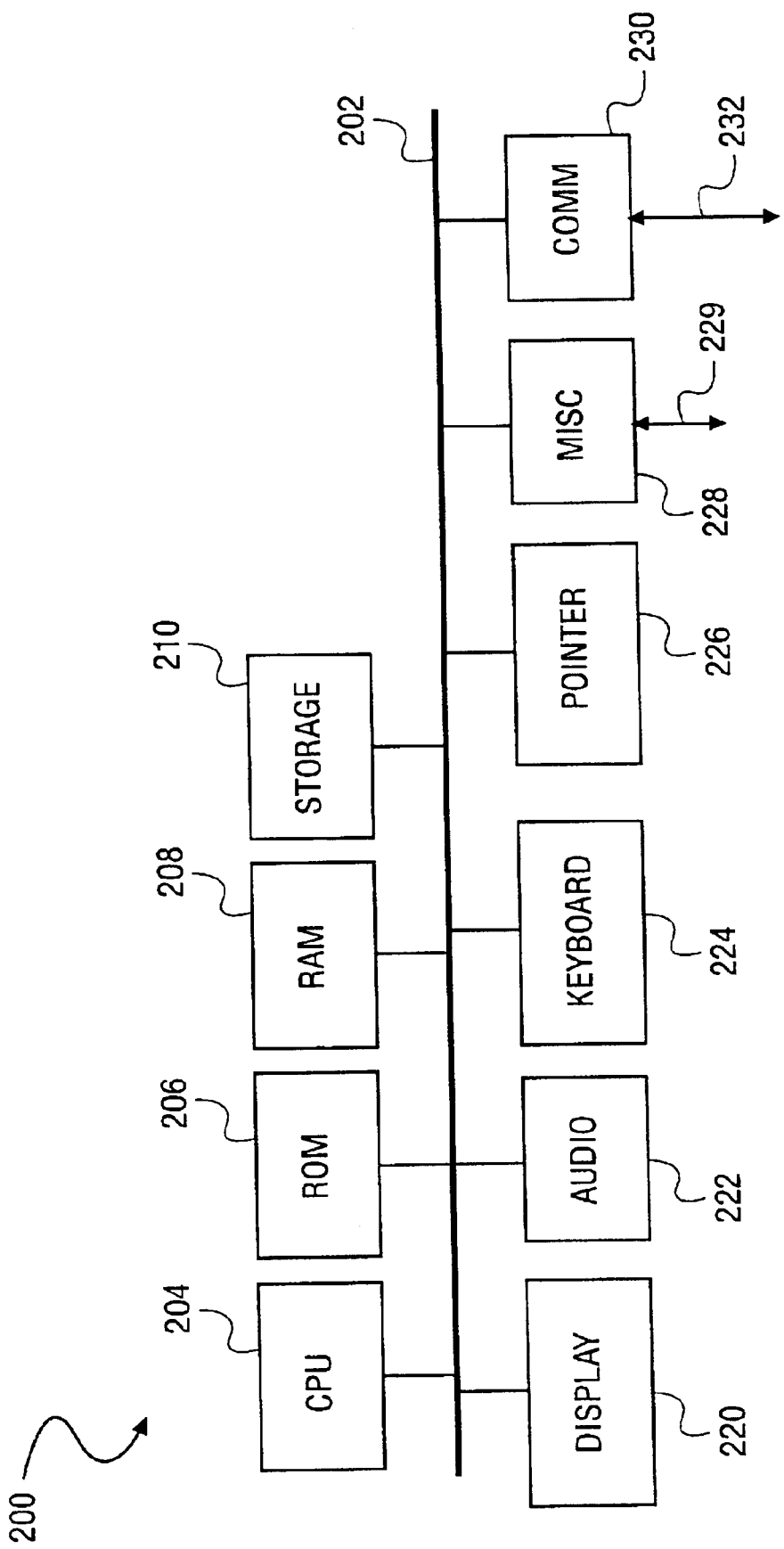
FIG. 2 depicts a block diagram illustrating a conventional computer system.

Referring to FIG. 2, FIG. 2 illustrates a conventional personal computer 200 in block diagram form, which may be representative of any of the clients 108 and servers 104, shown in FIG. 1. The block diagram is a high level conceptual representation and may be implemented in a variety of ways by various architectures. The computer 200 includes a bus system 202, which interconnects a Central Processing Unit (CPU) 204, a Read Only Memory (ROM) 206, a Random Access Memory (RAM) 208, a storage 210, a display 220, an audio 222, a keyboard 224, a pointer 226, miscellaneous input/output (I/O) devices 228, and communications 230.

The bus system 202 may be for example, one or more of such buses as a system bus, Peripheral Component Interconnect (PCI), Advanced Graphics Port (AGP), FireWire, etc. The CPU 204 may be a single, multiple, or even a distributed computing resource. The ROM 206 may be any type of non-volatile memory, which may be programmable such as, mask programmable, flash, etc.

In addition, RAM 208 may be, for example, static, dynamic, synchronous, asynchronous, or any combination. The storage 210 may be Compact Disc (CD), Digital Versatile Disk (DVD), hard disks (HD), optical disks, tape, flash, memory sticks, video recorders, etc. While the display 220 might be, for example, a Cathode Ray Tube (CRT), Liquid Crystal Display (LCD), a projection system, Television (TV), etc. Audio 222 may be a monophonic, stereo, three dimensional sound card, etc.

The keyboard 224 may be a keyboard, a musical keyboard, a keypad, a series of switches, etc. The pointer 226, may be, for example, a mouse, a touchpad, a trackball, joystick, etc. While the I/O devices 228 may be a voice command input device, a thumbprint input device, a smart card slot, a Personal Computer Card (PC Card) interface, virtual reality accessories, etc., which may optionally connect via an input/output port 229 to other devices or systems. An example of a miscellaneous I/O device 228 would be a Musical Instrument Digital Interface (MIDI) card with the I/O port 229 connecting to the musical instrument(s).

The communications device 230 might be, for example, an Ethernet adapter for local area network (LAN) connections, a satellite connection, a settop box adapter, a Digital Subscriber Line (xDSL) adapter, a wireless modem, a conventional telephone modem, a direct telephone connection, a Hybrid-Fiber Coax (HFC) connection, cable modem, etc. While the external connection port 232 may provide for any interconnection, as needed, between a remote device and the bus system 202 through the communications device 230.

For example, the communications device 230 might be an Ethernet adapter, which is connected via the connection port 232 to, for example, an external DSL modem. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

Referring back to FIG. 1, the plurality of clients 108 are effectively connected to web sites, application service providers, search engines, and/or database resources represented by servers, such as the plurality of servers 104, via the network 102. The web browser and/or other applications are generally running on the plurality of clients 108, while information generally resides on the plurality of servers 104. For ease of explanation, a single server 104, or a single client 108-1 will be considered to illustrate one embodiment of the present techniques. It will be readily apparent that such techniques can be easily applied to multiple clients, servers, or the like.

Accordingly, the various clients and servers as depicted in FIG. 1 are designed with the goal of implementing higher clock speeds resulting in computers that are both more powerful and also faster than conventional designs. As described above, one of the basic functions to the operation of virtually all computer systems, such as depicted in FIG. 1, is the capability of adding two integers. Having an addition function is essential because not only is addition used to provide numerical sums to users but it is also used in the implementation of numerous logic functions internal to the computer system, such as calculation of a physical address of a memory system.

Hence, one or more adders are typically found in the arithmetic logic unit of the computer's microprocessor. Consequently, by improving the efficiency of such adders the resulting computer systems will result in faster as well as more powerful computers. Unfortunately, conventional adders generally do not provide a regular, hierarchical structure suitable for performing the addition of large numbers. Furthermore, the delays associated with such adders generally do not scale up logarithmically with an increase in the number of bits to be added.

Figure 3:
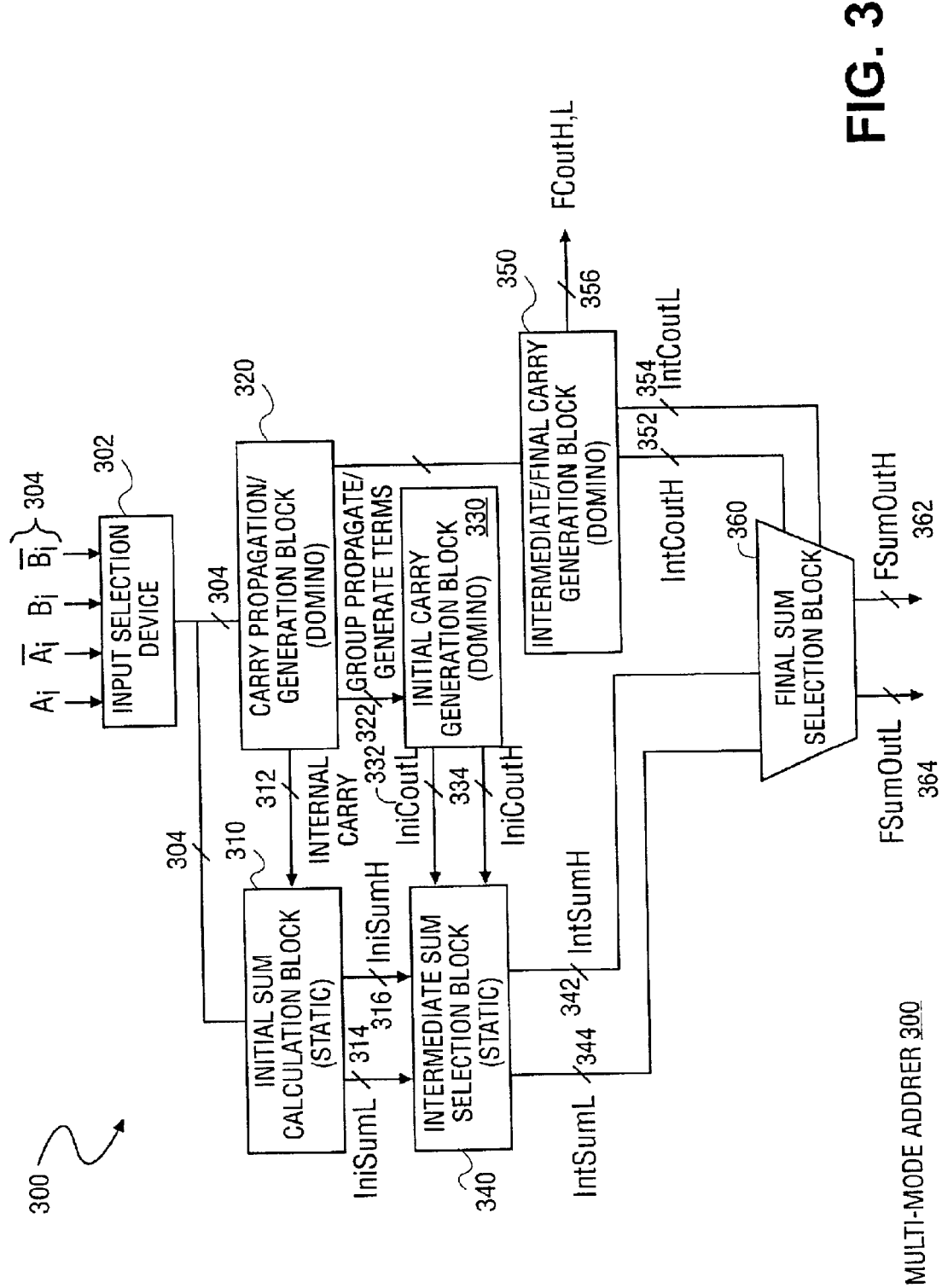
FIG. 3 depicts a block diagram illustrating a multi-mode, domino adder in accordance with one embodiment of the present invention.

Consequently, the present invention describes a multipurpose domino adder, one embodiment of which is depicted in FIG. 3. As depicted in FIG. 3, the multimode (See FIGS. 9A–9C) domino adder 300 is designed as quasi-domino adder that interfaces with static signals as well as domino signals and included the capability to add 2 of 2 or 8 sets of numbers. In one embodiment, the adder 300 may provide sum results with a carry-in equal to zero, as well as with the carry-in equal to one, so that a late carry-in signal can select the correct sum output during a latter portion of a clock cycle.

In the embodiment described, the adder 300 includes an input selection device 302, which receives corresponding pairs of augend and addend signals 304 for addition or subtraction operations. However, in order to provide improved efficiency, the adder 300 utilizes a domino signal critical path for calculating a carry-chain of carry-in/carry-out values, resulting in improved efficiency for calculation of large N-bit symbols without sacrificing accuracy during calculation of smaller addend and augend symbols. Accordingly, the addend and augend signals 304 are provided to a static initial sum calculation block 310.

In one embodiment, the static initial sum calculation block 310 includes a half-sum adder (performs a logical exclusive-OR (XOR) operation of each received bit pair), which adds the received addend and augend signals 304. The initial sum block 310 also receives an internal carry signal 312 from carry propagation/generation block 320. Utilizing the internal carry signal, the initial sum block 310 generates N-bit initial sums for each corresponding N-bit portions of the received addend signal and augend signal 304. Accordingly, in the embodiment described, the internal carry signal refers to the carry signal between individual bits of the N-bit addend and augend signal portions.

In the embodiment described, each initial sum calculated by the block 310 is calculated assuming a carry-in, to each N-bit initial sum equal to zero (IniSumL) 314 as well as a carry-in equal to one (IniSumH) 316. The IniSumL signal 314, as well as the IniSumH signal 316 are provided to intermediate sum selection block 340. In the embodiment described, the intermediate sum selection block 340 will select either IniSumL 314 or IniSumH 316 according to a carry-out value of a previously selected initial sum (IniC$_{OUT}$L 332/IniC$_{OUT}$H 334). Next, the block 340 will receive a carry-out signal for each selected initial sum within the respective group. Accordingly, a next initial sum (IniSumH/IniSumL) will be selected according to a received carry-out signal provided by an initial carry generation block 330. As such, the intermediate sum block will generate an intermediate sum assuming a carry-in equal to one (IntSumH 342), as well as assuming a carry-in equal to zero (IntSumL 344).

The initial carry generation block 330 will receive group carry propagation 322 and propagation signals 324 from the carry propagation/generation block 320. Once received, the initial carry generation block 330 will calculate a carry-out value for each initial sum and based on such values, the intermediate sums 342 and 344 may be formed. The intermediate sum selection block 340 may generate an intermediate sum assuming a carry-in value equal to one (IntSumH) 342, as well as assuming a carry-in equal to zero (IntSumL) 342, which are provided to the final selection block 360. The final selection block will then select a received intermediate sum signal 342/344 according to a received intermediate carry-out signal: IntC$_{OUT}$H 352, for a carry-in equal to one and IntC$_{OUT}$L 354, for a carry-in equal to zero.

As described herein, the intermediate carry signal (IntC$_{OUT}$) refers to the carry-out signal generated by each intermediate sum produced by the intermediate sum selection block 340. Accordingly, the final selection block will begin by selecting a least significant intermediate sum (IntSumL/IntSumH) 344/342. Once selected, a received intermediate carry-out signal will indicate whether the initial selected intermediate sum generates a carry-out signal equal to zero or a one. Based on the value of the carry-out signal, a next least significant intermediate sum will be selected, calculated with a carry-in matching the received carry-out signal. As such, this process will continue until a final (most significant position within final sum output) intermediate sum signal 342/344 is selected in order to form a final sum output value (FSumOut).

As such, the final selection block 360 will generate a final sum output assuming a carry-in equal to zero (FSumOutL) 364, as well as a final sum output assuming a carry-in equal to one (FSumOutH) 362. Consequently, an actual sum output for the adder 300 may be selected during a latter portion of a clock cycle, based on whether an initial carry-in value to the adder 300 is either a zero or a one. In addition, the final carry generation block 350 will also generate a final carry-out signal for each of the final sum outputs. As illustrated by the adder 300 depicted in FIG. 3, the carry signals, as well as the propagation and generation signals, are generated via a critical carry-chain path which is implemented using domino logic in order to provide a high speed adder design.

Figure 4:
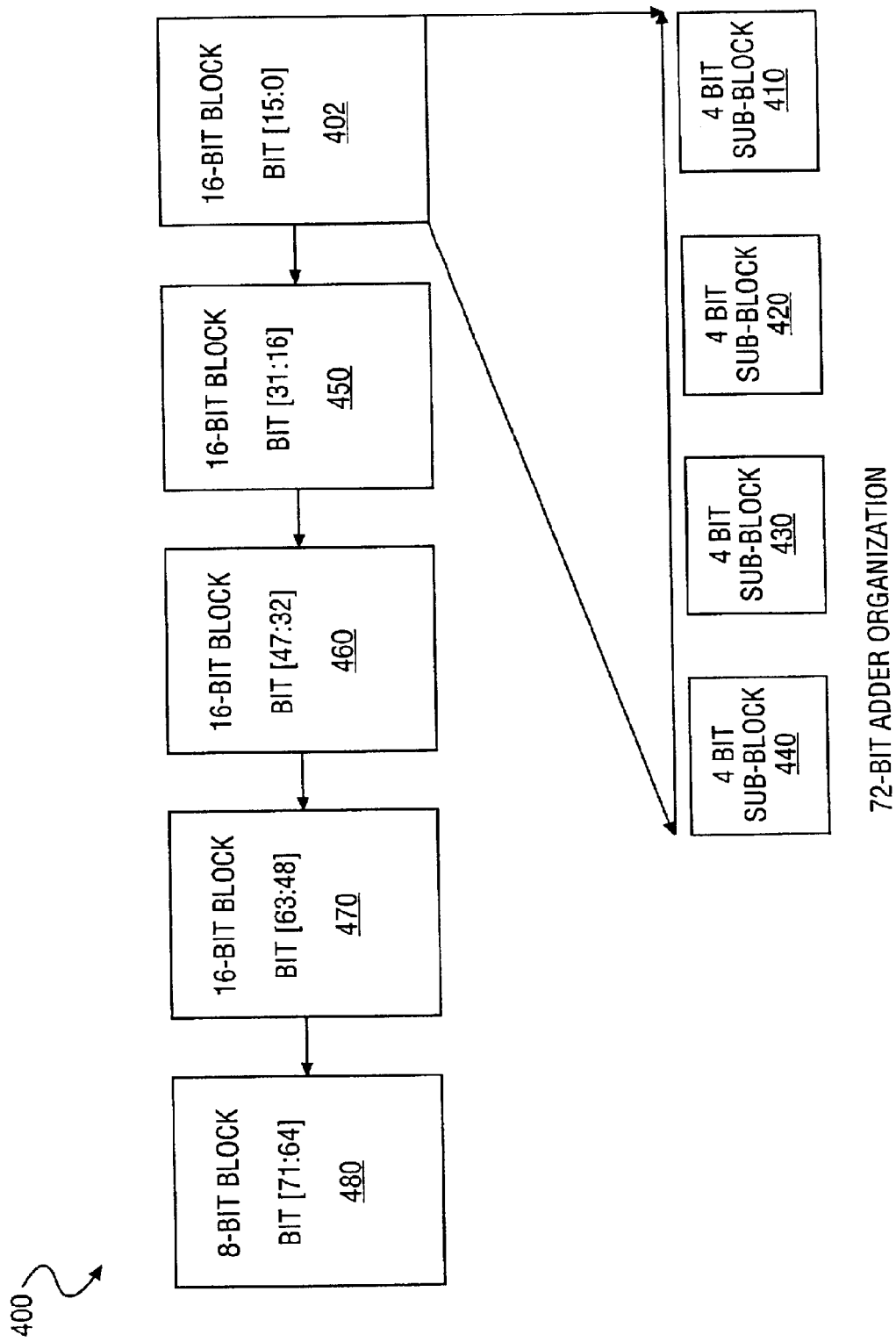
FIG. 4 depicts a block diagram further illustrating components of a 72-bit domino adder organization in accordance with a further embodiment of the present invention.

Referring now to FIG. 4, FIG. 4 depicts a 72-bit adder 400 organization in accordance with a further embodiment of the present invention. As depicted in FIG. 4, the adder 400 is implemented in both domino logic as well as static logic. In one embodiment, the critical carry-chain path, with the exception of the final stage 360 (FIG. 3), is implemented in domino logic while the non-critical path and the final stage are implemented in static logic in order to achieve a low power design resulting in a simplified design environment where static interfaces are used.

In the embodiment described, the 72-bit adder 400 is organized as four 16-bit block adders and one 8-bit block adder. As such, each 16-bit and 8-bit block adder each respectively utilize either four 4-bit subblocks or two four-bit subblocks. As illustrated, the data is propagated through the 4-bit sub-blocks in two different paths. One path assumes that the carry-in is one, while the other path assumes that the carry-in is zero. Concurrent with this data propagation, the same data is propagated through each 16-bit block. As such, outputs of each 16-bit block are then used to select the output of each subsequent of 16-bit blocks in order to produce a final sum output.

Figure 5A:
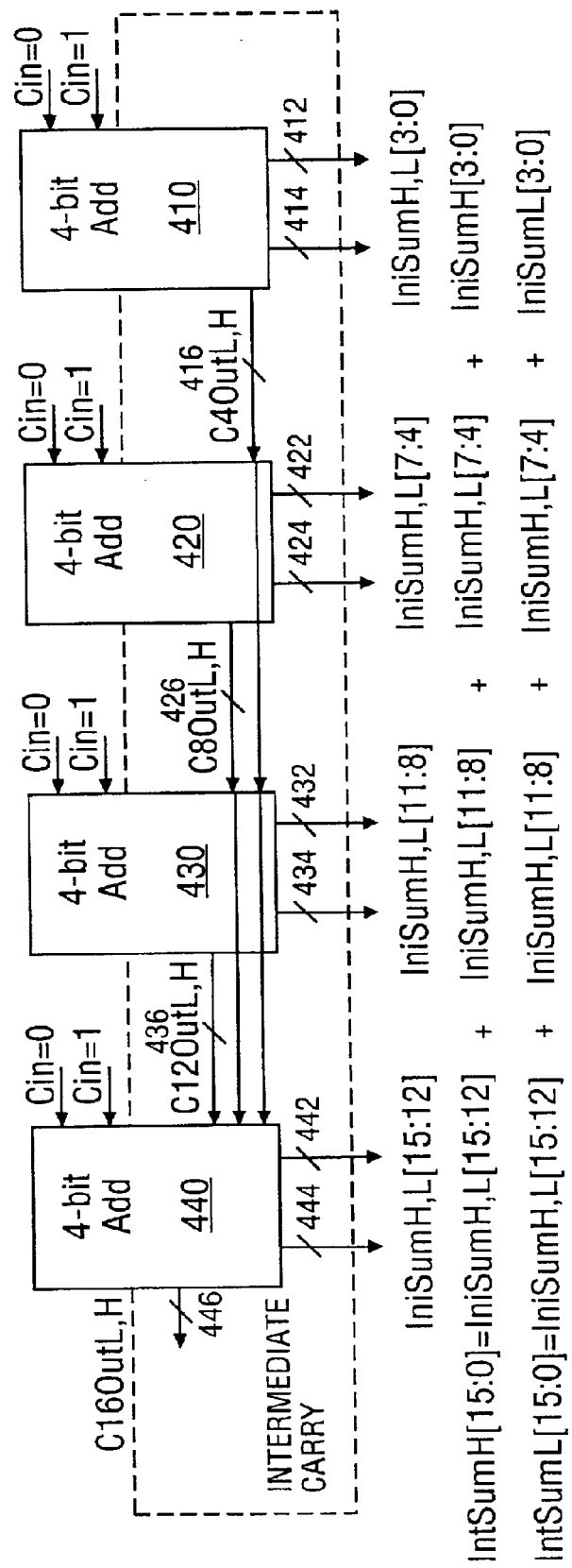
FIGS. 5A and 5B further illustrate the 72-bit adder as depicted in FIG. 4 in accordance with a further embodiment of the present invention.
Figure 5B:
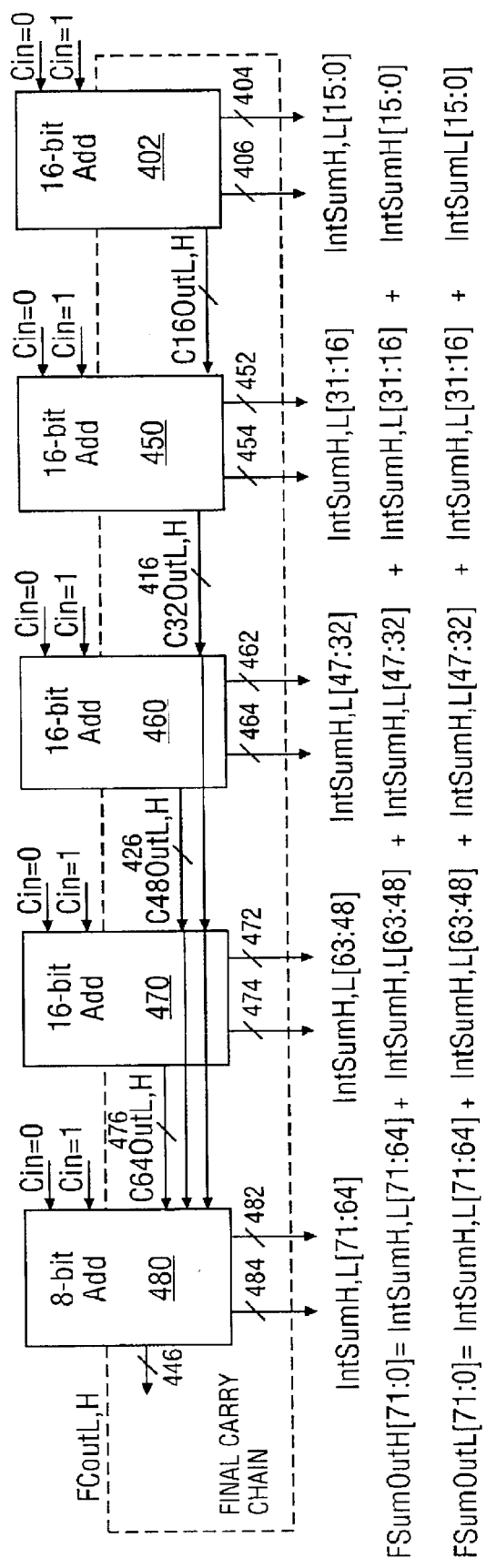

Referring now to FIGS. 5A and 5B, the figures further illustrate the adder 400 as depicted in FIG. 4. Accordingly, within each of the 16-bit adders 470-402, as well as the 8-bit adder 480, the adders will utilize 4-bit adder subblocks. Consequently, as depicted in FIG. 5A, an initial 16-bit block adder 402 will include four 4-bit adders 440-410. As illustrated, each 4-bit adder will calculate a 4-bit sum assuming a carry-out equal to one as well as a carry-in equal to zero, while disregarding a carry-out generated by the 4-bit sum. For example, the initial 4-bit adder 410 will generate an initial sum assuming a carry-in equal to one IniSumH30 412. In addition, the adder 410 will generate an initial sum assuming a carry-in equal to zero IniSumL30 414. Finally, a carry-out value for both IniSumH30 412 as well as IniSumL30 414 is generated (C4$_{OUT}$L, H 416).

As illustrated, each of the adders will generate initial sums assuming a carry-in equal to one, as well as a carry-in equal to zero, while ignoring carry-outs for previous adders. Once the initial sums are generated, each 16-bit adder, as well as the 8-bit adder depicted in FIG. 4, will generate an intermediate sum, assuming a carry-in to the respective adder equal to one (IntSumH) as well as a carry-in equal to zero (IntSumL). As such, in order to form IntSumH [15:0], IniSumH 412 (which is calculated assuming carry-in equal to one) is selected as the least significant portion [3:0] of IntSumH [15:0]. Next, a carry-out value for IniSumH 412 is determined. Once determined, either IniSumH 424 or IniSumL 422 is selected at a next least significant component [7:4] of IntSumH [15:0] based on the carry-out value 416 of IniSumH 412.

Accordingly, the carry-outs of each 4-bit block are propagated within either the 8-bit or 16-bit adder to generate the intermediate sums as described and a carry-out value for the entire 8-bit or 16-bit adder. As such, IntSumL [15:0] and C16$_{OUT}$L 446 are the sums and carry-out, assuming that the carry-in of the 16-bit adder 402 is zero, while IntSumH [15:0] and C16$_{OUT}$H are the sums and carry-outs, assuming that the carry-in of the 16-bit adder 402 is one. The corresponding values are also provided by the 8-bit adder.

As such, referring to FIG. 5B, an identical process is utilized within each 16-bit adder. Hence. IntSumH as well as IntSumL are used to generate a final sum output assuming a carry-in equal to one (FSum$_{OUT}$H), as well as the carry-in equal to zero (FSum$_{OUT}$L). Accordingly, the 72-bit adder will generate final sums according to the carry-outs of each of the 16-bit adder blocks. Consequently, FSum$_{OUT}$L [71:0] for a carry-in equal to zero and FSum$_{OUT}$H [71:0] are generated for a carry-in equal to one. In addition, a final carry-out for the adder is generated, assuming a carry-in equal to one (FC$_{OUT}$H), as well as a carry-in equal to zero (FC$_{OUT}$L).

Figure 6A:
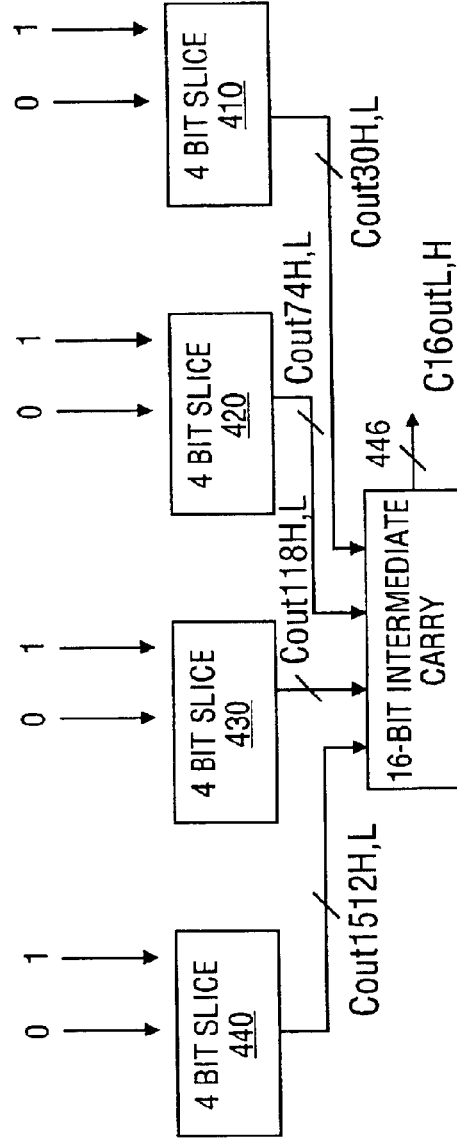
FIGS. 6A and 6B depict block diagrams further illustrating the 72-bit adder organization as depicted in FIG. 4 in accordance with the further embodiment of the present invention.
Figure 6B:
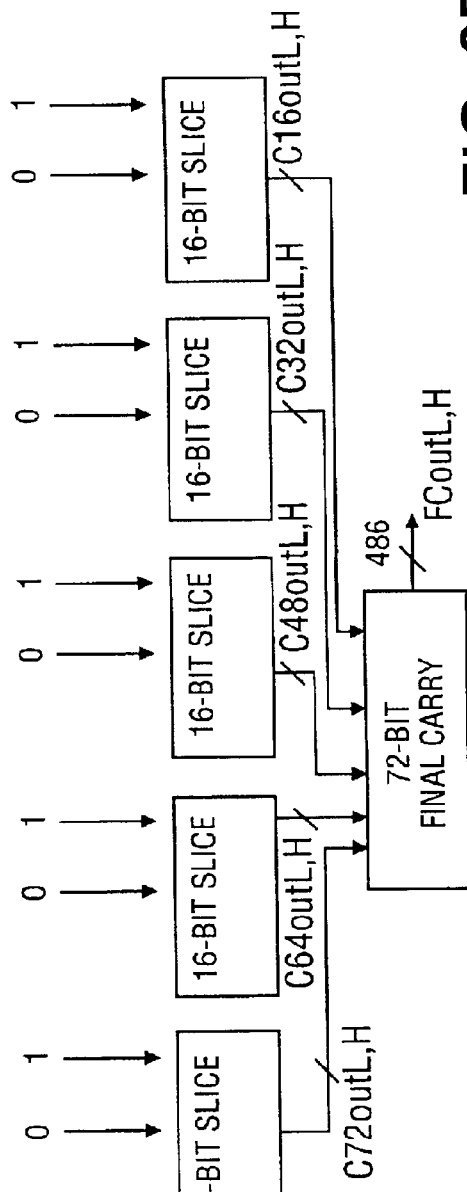

Referring now to FIGS. 6A and 6B, both FIGS. 6A and 6B illustrate either the intermediate carry-out for 16-bit block or the final carry-out generation for the entire adder. As such, by utilizing each initial carry-out generated by each 4-bit adder, the 16-bit intermediate carry block 492 is able to generate a carry-out value for the respective blocks for either a 16-bit block (C16$_{OUT}$H, L), as depicted in FIG. 6A or the entire adder (FC$_{OUT}$H, L), as depicted in FIG. 6B.

Figure 7:
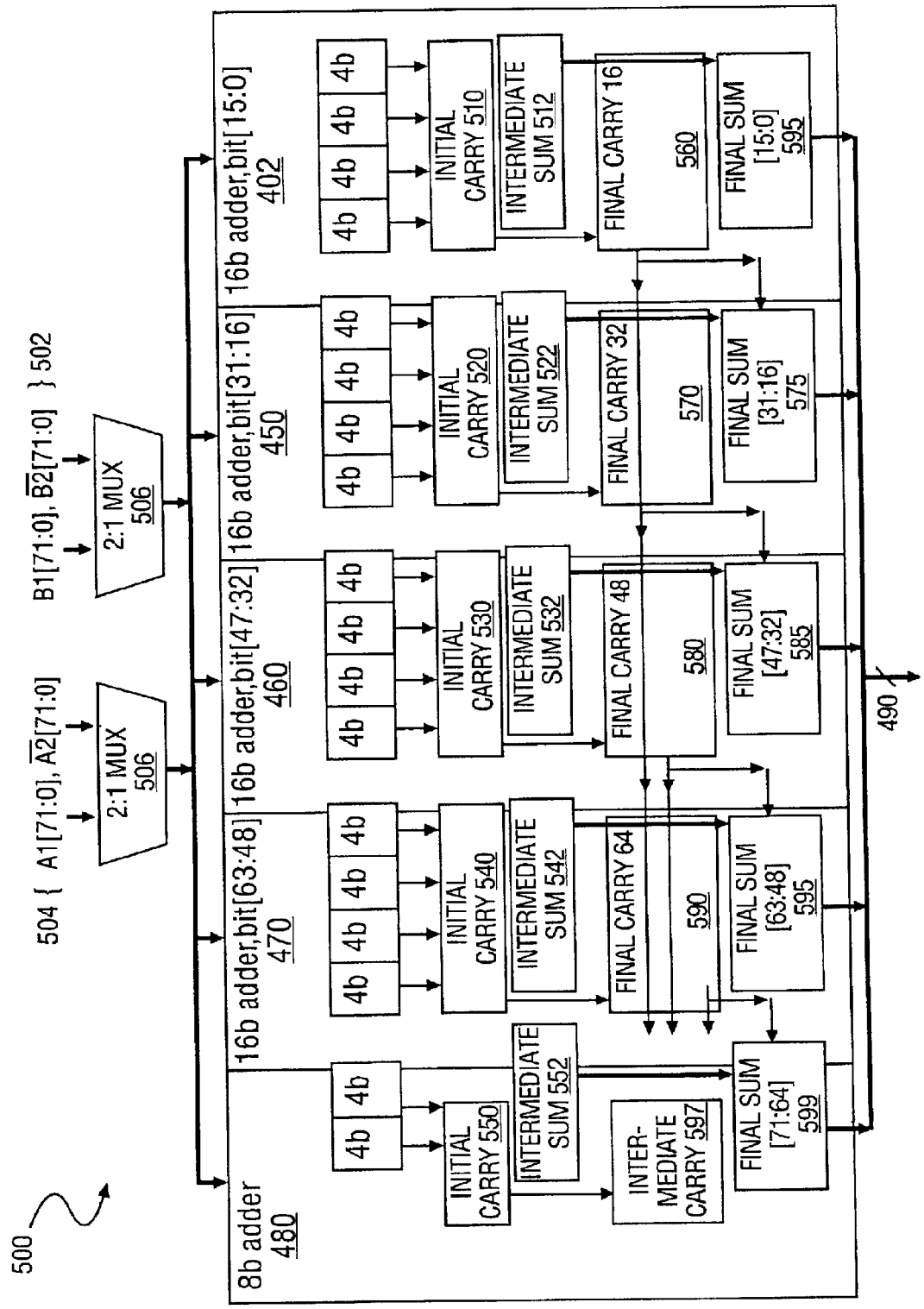
FIG. 7 depicts a block diagram illustrating a 72-bit domino adder in accordance with a further embodiment of the present invention.

Referring now to FIG. 7, FIG. 7 depicts a 72-bit adder 500, which incorporates the features of the adder 400 as depicted in FIGS. 4–6B. Accordingly, the adder 500 includes a pair of input selection gates 506, 508, which select addend and augend signals. The addend and augend signals are then utilized to calculate corresponding 4-bit initial sums, in parallel, within the various 8-bit and 16-bit adders, as described above. Each initial value is utilized to generate an intermediate sum within the various intermediate sum blocks 512–552 based on an initial carry received from each 4-bit block. Once the intermediate sums are generated, the carry-out value of each intermediate sum is utilized by the intermediate carry blocks 590–560 in order to generate final sum outputs in parallel.

Figure 8:
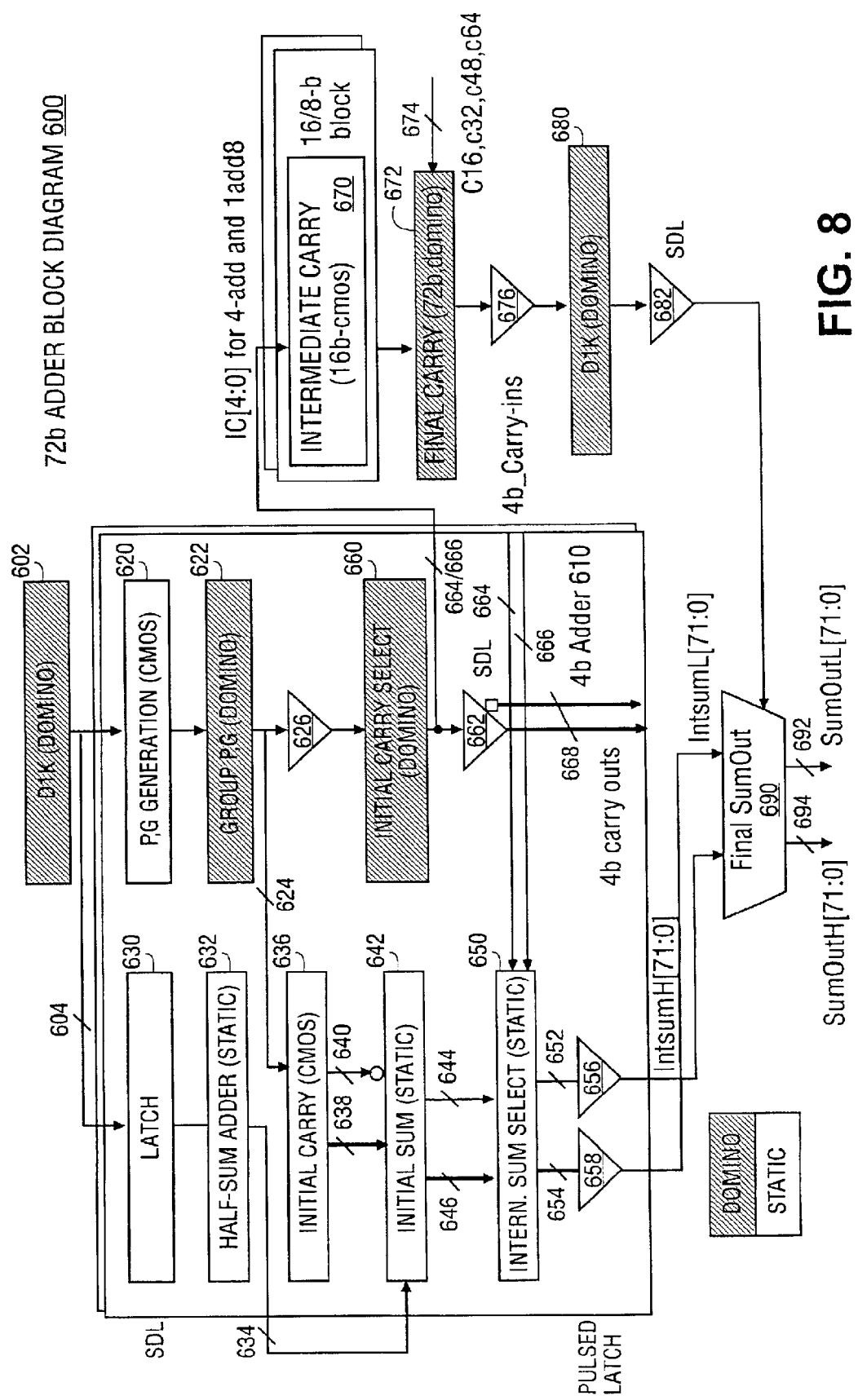
FIG. 8 depicts a block diagram illustrating a 72-bit domino adder in accordance with an exemplary embodiment of the present invention.

Accordingly, FIG. 8 depicts a block diagram illustrating an exemplary embodiment of a 72-bit multi-purpose domino adder 600. The multi-purpose domino adder circuit 600 received four pairs (72-bits) of inputs from different sources and selects two out of the four received pairs to send through the adder 600. The complement addend and augend signals ($\overline{A}i$, $\overline{B}i$) are provided to enable 72-bit subtraction. As such, those skilled in the art will appreciate that the techniques described herein can be applied to subtraction. In one embodiment, the 72-bit adder 600 is organized as four-16-bit and one-8-bit block. Each 16-bit block generates its own conditional sum and the final sums are selected later, utilizing internal, initial and intermediate signals. Accordingly, four sets of 72-bit inputs arrive in parallel at the input selection gate 602. In one embodiment, the four sets of 72-bit inputs are either static signals or domino signals.

Accordingly, when the input selection gate 602 receives domino signals, the domino signals 604 are provided to a latch 630 in parallel with providing of the domino signals 604 to a PG generation block 620. As such, the latch 630 will convert the domino signal 604 into static signals and provide the static signals to a half-sum adder 632. The half-sum adder will generate a half-sum of the received 72-bit inputs and provide the output 634 to an initial sum block 642 according to the following equation:

$$q_i = a_i \text{ XOR } b_i \tag{1}$$

The propagate (P) generate (G) generation block 620 will generate propagate and generate terms according to the following equation:

$$P := a_i \text{ OR } b_i \tag{2}$$

$$G := a_i \text{ AND } b_i \tag{3}$$

Accordingly, the values $a_i$ and $b_i$ refer to received addend and augend signals. The propagate and generate terms are then provided to a group PG block 622. As such, the group PG block 622 will generate group propagate and group generate terms utilizing the Ling-Adder algorithm. The theory of the Ling-Adder algorithm is provided within the article "High-Speed Binary Adder," by Huey Ling, *IBM J.*

Res. Develop., Vol. 25, No. 3, May 1981, pp. 157–166. The group generate (gg) and propagate (gp) terms (at the indicated bit position, e.g., [3:0], [7:4], . . . ) are generated as follows:

Since gi:=gi*pi, the carry-out of a 4-bit adder group is defined as:

$gg\_30=g3+g2p3+g1p2p3+g0p1p2p3$ (Cin ignored for simplicity)

This equation can be re-written:

$gg\_30=p3(g3+g2+g1p2+g0p1p2)$.

The adder 600 takes advantage of the above property by defining the Pseudo carry for group carry generation (ggs) and group carry propagation (ggp) as:

$ggs\_30\_g3+g2+g1p2+g0p1p2$ and shifting the P term to next position, eg. $gps\_74=p6*p5*p4*p3$, the actual carry (C4) is $c4=p3*ggs\_30$. This block generates all individual pseudo Ps and Gs:

$ggs\_30 = g3 + g2 + g1p2 + g0p1p2$    $gps\_30 = p2*p1*p0$ $ggs\_20 = g2 + g1 + g0p1$    $gps\_20 = p1*p0$ $ggs\_10 = g1 + g0$    $gps\_10 = p0$ $ggs\_00 = g0$    (this is a special case for the first)

The rest of the 4-bit P,G groups are defined as:

$ggs\_74 = g7 + g6 + g5g6 + g4p5p6$    $gps\_74 = p6*p5*p4*p3$ $ggs\_64 = g6 + g5 + g4p5$    $gps\_64 = p5*p4*p3$ $ggs\_54 = g5 + g4$    $gps\_54 = p4*p3$ $ggs\_44 = g4$    $gps\_44 = p3$ Outputs of each 4-bit adder group (ggs_30, gps_30, ggs_74, gps_74 . . . ) are used for the intermediate carry generation, while the rest are used for initial carries. As such, the carry-out values generated by the initial carry-out block 636, then the intermediate carry-out block 670 as well as the final carry-out block 672 are calculated as follows:

4b adder [3:0]

$ggs\_30L = g3 + g2 + g1*p2 + g0*1*2 \rightarrow Cout30L$ (4)

$gps\_30 = p2*p1*p0 \rightarrow GP30$ (5)

4b adder [7:4]

$ggs\_74L = g7 + g6 + g5p6 + g4p5p6 \rightarrow Cout74L$ (6)

$gps\_74 = p6*p5*p4*p3 \rightarrow GP74$ (7)

4b adder [11:8]

$ggs\_118L = g11 + g10 + g9p10 + g8p9p10 \rightarrow Cout118L$ (8)

$gps\_118 = p10*p9*p8*p7 \rightarrow GP118$ (9)

4b adder [15:12]

$ggs\_1512L = g15 + g14 + g13p14 + g12p13p14 \rightarrow Cout1512L$ (10)

-continued $gps\_1512 = p14*p13*p12*p11 \rightarrow GP1512$ (11)

16b adder [15:0]

$ggs\_150L = ggs\_1512L + ggs\_118L*gps\_1512 +$ (12)
$ggs\_74Lgps\_118*gps\_1512 + ggs\_30L*$
$gps\_74*gps\_118*gps\_1512 \rightarrow Cout150L$ $gps\_150 = gps\_1512*gps\_118*gps\_74*gps\_30$ (13)

$ggs\_150H = ggs\_1512L + ggs\_118L*gps\_1512$ (14)
$ggs\_74L*gps\_118*gps\_1512 + ggs\_30L*$
$gps\_74*gps\_118*gps\_1512 + gps\_30*$
$gps\_74*gps\_118*gps\_1512 \rightarrow Cout150H$ 72b adder [71:0]

$Carry\text{-}out72H = p71*(ggs\_7164L + ggs\_6348L*$ (15)
$gps\_7164 + ggs\_4732L*gps\_6348*$
$gps\_7164 + ggs\_3116L*gps\_4732*$
$gps\_6348*gps\_7164 + ggs\_150L*$
$gps\_3116*gps\_4732*gps\_6348*$
$gps\_7164 + gps\_150*gps\_3116*$
$gps\_4732*gps\_6348*gps\_7164)$

*Carry-out72L* is the 72b carry-out with Cin = 0 is the *Carry-out72H* without the last term.

The various values generated by the group PG block 622 are provided to an initial carry block 636, as well as an intermediate carry block 670 in parallel with generation of the respective initial and intermediate sums in order to form final sum output values and final carry-outs. Accordingly, the initial carry block 636 will receive a pair of internal carry-in (IntCinH 638, IntCinL 640) values for each pair of bits summed by the half-sum adder 632. These various initial carry values 638, 640 are then provided to initial sum block 642. Accordingly, the initial sum block will utilize the various carry-in values and generate initial sums for each corresponding N-bit portions (InitialSum) of the received addend and augend signals 604 as follows:

$InitialSum_i = q_i \text{XOR IntCin}_i,$ (16)

where $IntCin_i = G_{i-1} + (P_{i-1})(IntCin_{i-1})$ (17)

Each N-bit initial sum will be calculated assuming a carry-in equal to one (IniSumH 646) as well as a carry-in equal to zero (IniSumL 644).

As such, the initial sums 644 and 646 will be provided to an intermediate sum selection block 650. The intermediate sum selection block 650 will receive a carry-in value, which corresponds to a carry-out value produced by a previously calculated N-bit initial sum, from initial carry select block 660. Accordingly, the intermediate sum selection block 650 will be able to form intermediate sums for each 16-bit adder block as well as the 8-bit adder block, assuming a carry-in equal to one as well as a carry-in equal to zero for each block.

This is performed by taking each group of four initial sums and forming the intermediate sum by selecting initial sums, each calculated within a carry-in value matching the carry-in value of a previously calculated initial sum beginning with an initial sum (least significant position) matching the carry-in value of the respective intermediate sum (See FIGS. 5A and 5B). As such, matching initial sums will form the intermediate sum, which are calculated with matching carry-in values, as will be described in further detail below. Finally, the intermediate sums will be provided to a final sum output block 690. The final sum output block will receive carry-in values for each intermediate sum in order to form a final sum, as will be described in further detail below.

Figure 9C:
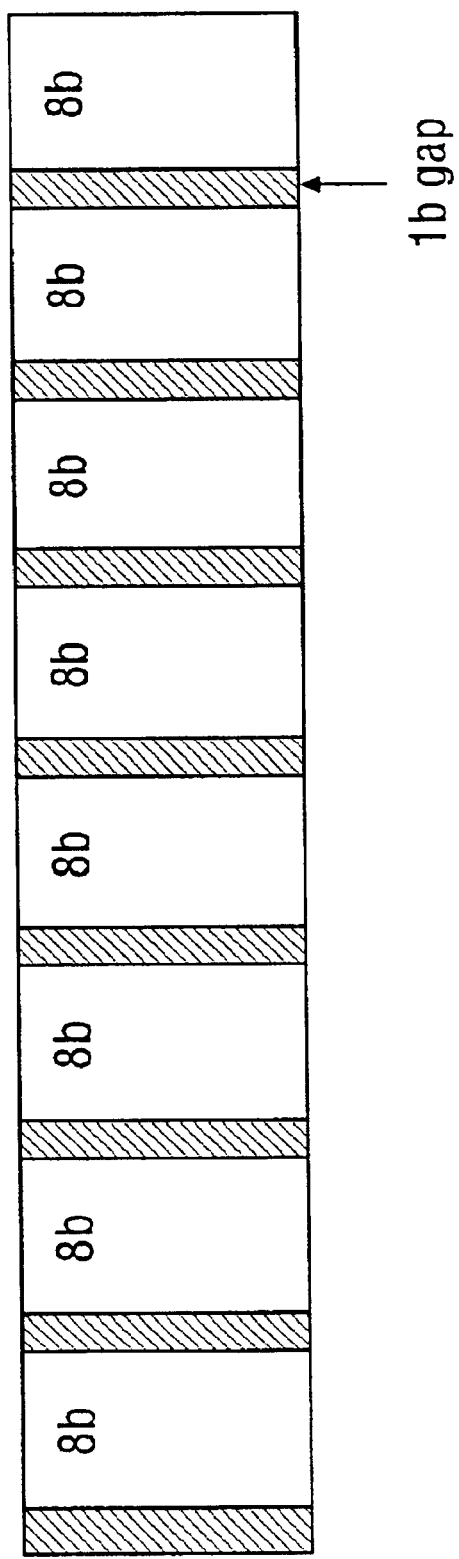

Referring now to FIGS. 9A–9C, the figures depict various modes supported by the adder 600 as depicted in FIG. 8. Accordingly, in one embodiment, the adder 600 includes a mode selection circuit to receive a mode selection signal and direct the apparatus to function in one of a 72-bit adder mode, a two 28-bit adder mode and an eight 8-bit adder mode. FIG. 9A depicts a 72-bit operation mode 600-1 of the adder, as described with reference to FIG. 8. FIG. 9B depicts a 24/28 bit operation adder 600-2. In this mode, a signal (VxUop) 699 is set in order to direct a 72-bit adder 700 to work as two 28-bit adders. Accordingly, in order to modify the adder as depicted in FIG. 8 in order to perform in this 24/28 bit operation mode, the following conditions of unused data bits are satisfied. Bits [31:28] and [71:68] are not used and are accordingly set with bits indicating "DON'T CARE" except for the 31$^{st}$ bit of both sources.

Accordingly, the 31$^{st}$ bit is set in order to ensure that no carry-out at bit 31 is generated and propagated to a next adder. Finally, bits [39:32] toward the center of the adder serve as a propagate term for the carry-in. As such, one source is set to all ones, while another source is set to all zeroes. In one embodiment, instead of breaking out the carry-out of bit 31 off the carry chain in order to avoid propagation, the data flow may be maintained by forcing a no carry-out for bit 31 (COUT 32=0). As such, P31 term may be set to 1 by a VxUop signal in addition to the GPS "31" set to 1.

Finally, FIG. 9C depicts an MMX mode 600-3. In this mode, the 72-bit adder will work as eight 8-bit adders, with each 8-bit adder separated by a 1-bit slice gap. Both the sources of the 1-bit gap are set to zeroes, thus the carry-out of each 8-bit adder is not propagated to the next adder to corrupt their data. Accordingly, in the various adders described, the critical path is implemented in domino logic to shorten the propagation delay of the various carry-in signals while the non-critical path is performed utilizing static logic to reduce power. As such, the critical path is the carry-out of each 4-bit and 16-bit adder portions, as well as the logic to generate carry-outs of the 32-bit, 48-bit, 64-bit and 72-bit portions of the adder. Likewise, the non-critical path involves the calculation of the initial, the intermediate and the final sums, which are implemented in static logic to reduce power.

Normally when the 72b adder functions in the X87 mode, the carry-out of bit 31 is driven a very long distance (40-bit wide), and is a critical signal inside the adder. Thus, when the adder functions Vx mode, (two 28-bit adders) a muxing level is required in the data-path in order to cut off the path and force the carry-in. This will slow down the path and increase the delay. This may be provided by a mode selection circuit (not shown).

Alternatively, the carry-out is broken from the carry-chain by forcing the un-used data bit 31 to all zeroes, the propagate term for bit 31 (p31) term to be a "1" by the VxUop and gps_31_0 term be "1". This allows us to use the same data-path without any logic gate insertion in the worst case data path.

Accordingly, the various carry-out generation equations (4–15) are modified as follows to generate the carry-out of bit 47 (Cout48) below in order to implement Vx mode:

X87 Logical Equations $$Cout48Hi = ggs\_47\_32 + gps\_47\_32 * (gps\_31\_0 + Cout32Lo) \quad (18)$$

$$(Carry\text{-}in = \text{``}1\text{''})$$

$$Cout48Lo = ggs\_47\_32 + gps\_47\_32 * (Cout32Lo) \ (Carry\_in = \text{``}0\text{''}) \quad (19)$$

$$gps\_47\_32 = (gps47\_40) * (gps\_39\_36) * (gps\_35\_32) \quad (20)$$

and $$gps\_35\_32 = p34 * p33 * p32 * p31 \quad (21)$$

In the Vx mode we want to use the same signal as normal, therefore, we must force the following signals are set as follows:
Now the 72b adder can be used as 2 independent adders (28 bits)

$$Cout48Hi = ggs\_47\_32 + gps\_47\_32 \ (Carry\text{-}in = \text{``}1\text{''}) \quad (22)$$

$$Cout48Lo = ggs\_47\_32 \ (Carry\_in = \text{``}0\text{''}) \quad (23)$$

$$gps\_47\_32 = (gps47\_40) * (gps\_39\_36) * (gps\_35\_32) \quad (24)$$

and $$gps\_35\_32 = p34 * p33 * p32 * p31 \quad (25)$$

Figure 10:
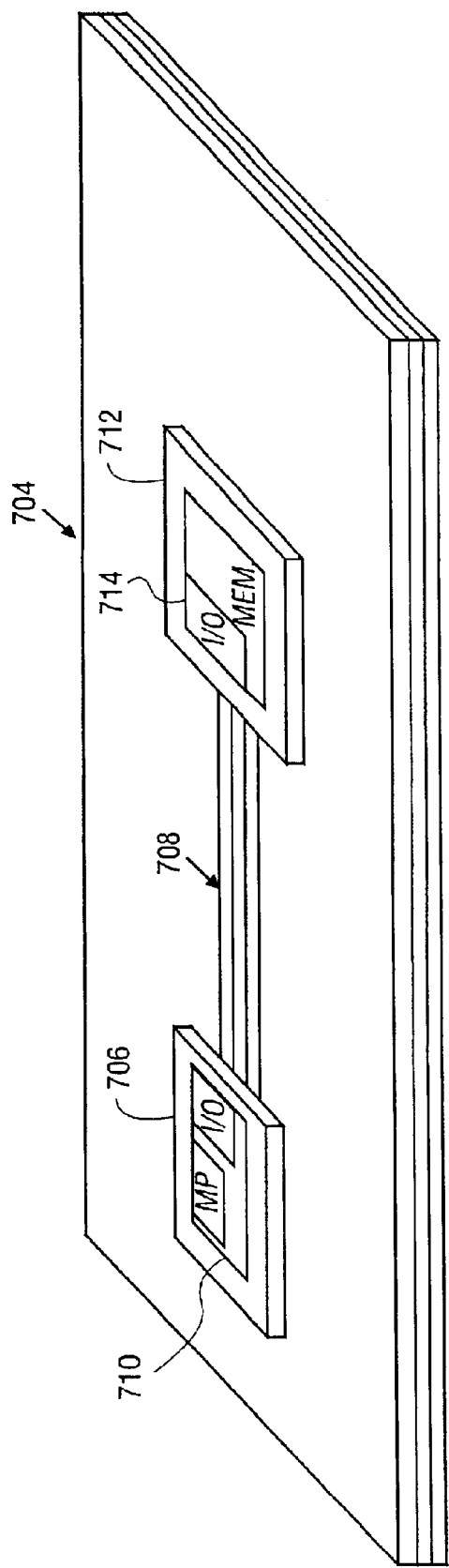
FIG. 10 depicts a block diagram illustrating a computer system utilizing a multi-purpose domino adder in accordance with a further embodiment of the present invention.

Turning now to FIG. 10, what is shown is a block diagram of an embodiment of an electronic system 700 in which a logic function section features the domino adder as described above. The system includes a multi-layer printed wiring board 704 on which a parallel bus 708 is formed. The bus 708 may be of the point to point variety, or a multi-drop bus such as those used in a main memory. An integrated circuit (IC) chip package 706 is operatively installed on the board to communicate using the parallel bus 708. The installation of the package 706 may be done by a surface mount technique or via a connector or socket.

In addition, the package has an IC chip 710 that includes the logic function section, and an I/O section as an interface between the logic function section and the bus 608. The logic function suction may be one of the following well-known devices: a microprocessor, a floating point unit, and an arithmetic logic unit (ALU). Alternatively, other devices that can be implemented in the logic function section of an IC chip may be used. The I/O section has a bus receiver in which an equalization loop as described above is provided.

A second IC package 712 is also installed on the board 704 to communicate with the first package 706 via the bus 708. The second IC package 712 also includes a chip 714 having an I/O section in which a bus receiver is provided to interface the bus 708, and its own logic function section (here shown as a memory controller).

According to an embodiment, the logic function section, utilizing a domino adder of the two chips 710 and 714 support static input or domino input signals while generating a static output. Thus, in such an embodiment, domino adders are provided, in both IC chips, that are connected to the same conductive lines of the bus 708 and thus can be utilized by other static logic. Other system applications of the domino adder are possible, including, for example, arithmetic logic units, floating point units or the like. Procedural methods for implementing the teachings of the present invention are now described.

Operation

Figure 11:
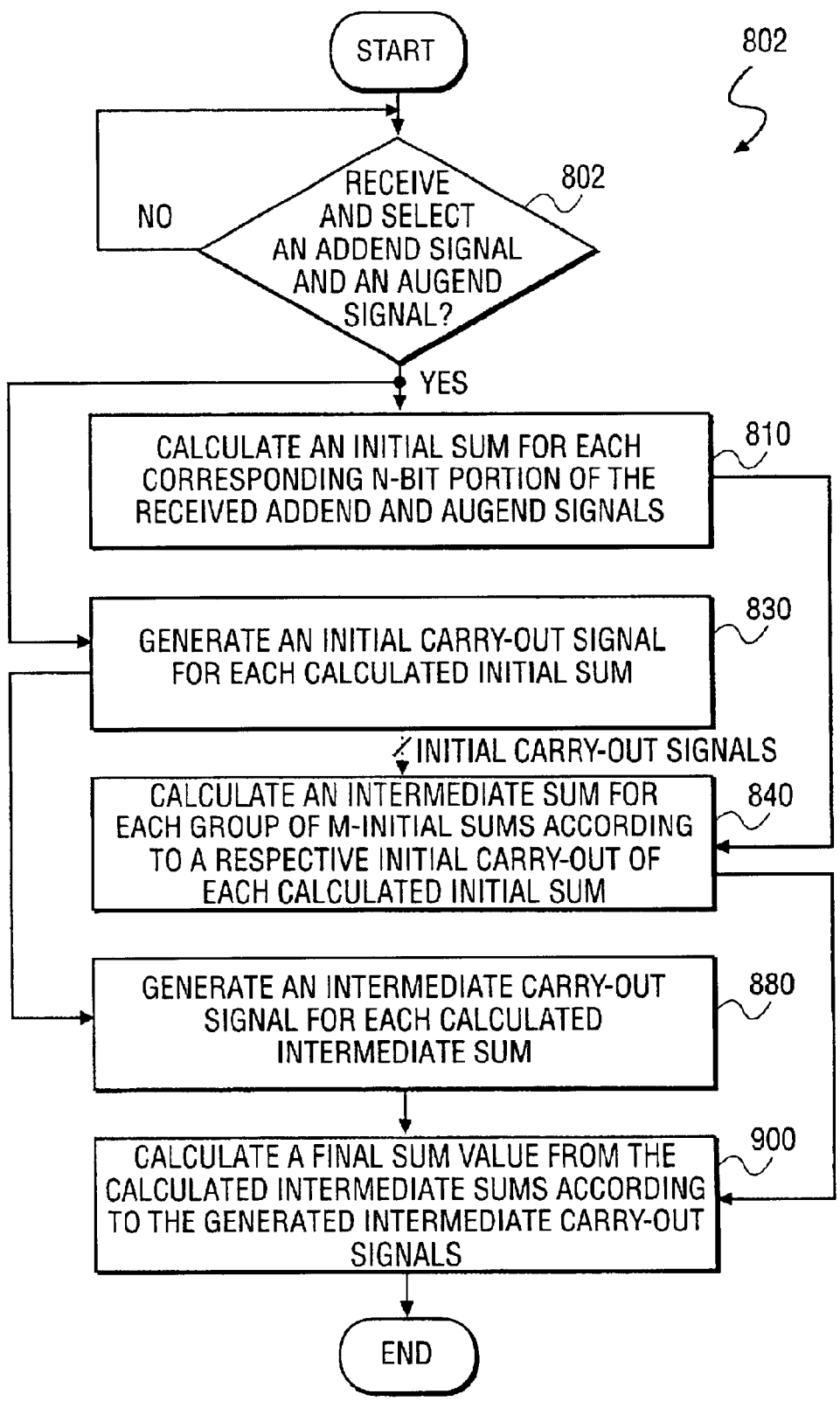
FIG. 11 depicts a flowchart illustrating a method of operation of a multi-purpose domino adder in accordance with one embodiment of the present invention.

Referring now to FIG. 11, FIG. 11 depicts a flowchart illustrating a method 800 of operation of a multi-purpose domino adder, for example as depicted in FIG. 3, in accordance with one embodiment of the present invention. At process block 802, the adder 300 will receive selected addend signal and an augend signal. In one embodiment, the adder 300 may select complement addend and augend signals in order to perform binary subtraction. In one embodiment, the addend and augend signals are initially received as domino signals. Next, at process block 810, the adder 300 will calculate an initial sum for each corresponding N-bit portion of the received addend and augend signals. The initial sum calculation is performed within the initial sum calculation block 310.

As such, when the received addend and augend signals are provided in a domino format, the initial sum block 310 will convert the addend and augend signals into a static format. Concurrently, at process block 830, the adder 300 will generate an initial carry-out signal for each calculated N-bit initial sum of process block 810. In one embodiment, generation of initial carry-out signals is performed by initial carry-out generation block 330, which utilizes domino formats of the addend and augend signals, as well as group carry propagate signal terms and group carry generation terms provided by carry propagation/generation block 320, which are also provided in a domino format.

Once the initial carry-out signals have generated, at process block 840, the adder 300 will calculate an intermediate sum for each group of M-initial sums according to an initial carry-out value of each calculated initial sum. In one embodiment, the initial sums are grouped into four pairs of initial sums organized beginning with a least significant initial sum and continuing until a most significant initial sum, as will be described in further detail below (See FIGS. 5A and 5B). Concurrently, at process block 880, the adder 300 will generate an intermediate carry-out signal for each calculated intermediate sum of process block 840.

In one embodiment, this is performed using the intermediate/final carry generation block 350, which also provides carry-out signals in domino format, which are generated using group carry generation and group carry propagation terms received from the carry propagation/generation block 320. Finally, at process block 900, the adder 300 will calculate a final sum value from the calculated intermediate sums according to the generated intermediate carry-out signals of process block 880. Accordingly, process blocks 810, 840 and 900 indicate a static sum generation path, while process blocks 830 and 880 indicate a domino carry-chain generation path. As such, the carry-chain generation is performed along a critical path to generate carry-in values in parallel with the static sum generation in order to form final sums.

Referring now to FIG. 12, FIG. 12 depicts a flowchart illustrating an additional method 810 for calculating initial sums of process block 810 as depicted in FIG. 11. At process block 814, a half-sum adder within the initial sum calculation block will calculate N-bit half-add sums of each bit pair of the addend and augend signals. In one embodiment, this is performed by performing an exclusive-OR (XOR) operation between corresponding pairs of the addend and augend signals. Concurrent with generation of the half sums at process block 816, an internal carry-out signal is received for internal bits of each half add sum. In one embodiment, the internal carry signal is generated in parallel with the half-add sum according to received carry propagation and carry generation signals.

For example, referring to FIG. 8, the adder 600 will generate carry propagation and carry generation terms utilizing a PG generation block 620. Once generated, these values are provided to initial carry block 640. Accordingly, at process block 818, the initial carry block will combine corresponding internal carry-out signals received from the PG generation block 620 with corresponding N-bit half-add sums to form each N-bit initial sums (according to equation 16). In one embodiment, the initial carry block will generate N-bit initial sums, assuming a carry-in value equal to one, as well as a carry-in value equal to zero.

Referring now to FIG. 13, FIG. 13 depicts a flowchart illustrating an additional method 804 performed in response to receiving the selected addend and augend signals at process block 802, as depicted in FIG. 11. At process block 804, a latch 630 (FIG. 8) will generate static addend and augend signals from received domino addend and augend signals. Once generated, at process block 806 the latch 630 will provide the static addend and augend signals to the static initial sum adder 642. Concurrently, at process block 808 an input selection block 602 will also provide the domino addend and augend signals to a domino PG generation block 622.

Finally, at process block 809 the PG generation block 620 will generate carry propagation and carry generation terms (See equations 2–15), as described above, which will be provided to the group PG generation block 622, which will further generate group carry generation signals and group carry propagation signals in response to the received addend and augend domino signals. As such, carry generation and propagation terms will be utilized by the adder in order to generate the various carry-out values of initial sums, internal sums and final sums along a critical path in order to provide improved efficiency in parallel with the static sums calculations to generate final sum outputs.

Figure 14:
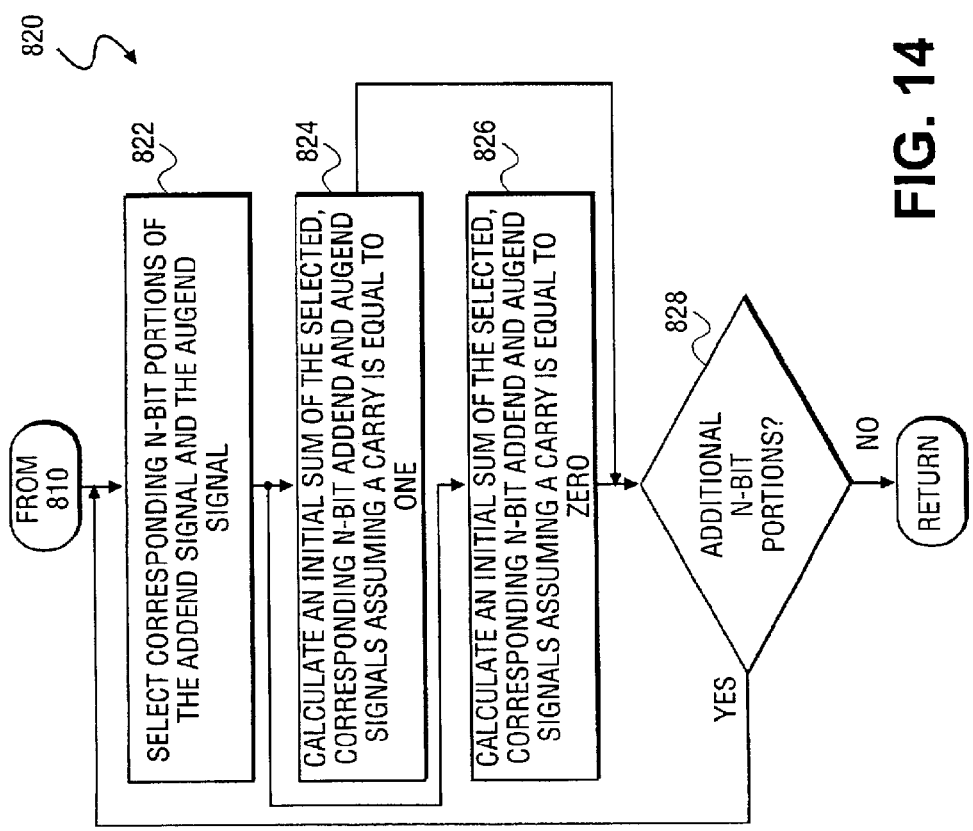
FIG. 14 depicts a flowchart illustrating an additional method for calculating initial sums within a multi-purpose domino adder in accordance with a further embodiment of the present invention.

Referring now to FIG. 14, FIG. 14 depicts a flowchart illustrating an additional method 820 for calculating initial sums of process block 810, for example, as depicted with reference to FIGS. 5A–6B. At process block 822, an initial sum generation block 642 will select corresponding N-bit portions of addend and augend signals. Once selected, at process block 824, the half-adder 632, in conjunction with the initial carry block 640 as well as the initial sum block 642, will calculate an initial sum of the selected corresponding N-bit addend and augend signals, assuming a carry-in equal to one (IniSumH). Concurrently, at process block 826, the corresponding blocks will calculate an initial sum of the selected corresponding N-bit addend and augend signals, assuming a carry-in equal to zero (IniSumL). Finally, at process block 828, process blocks 822–826 will be repeated for each corresponding N-bit portions of the addend and augend signals.

Figure 15:
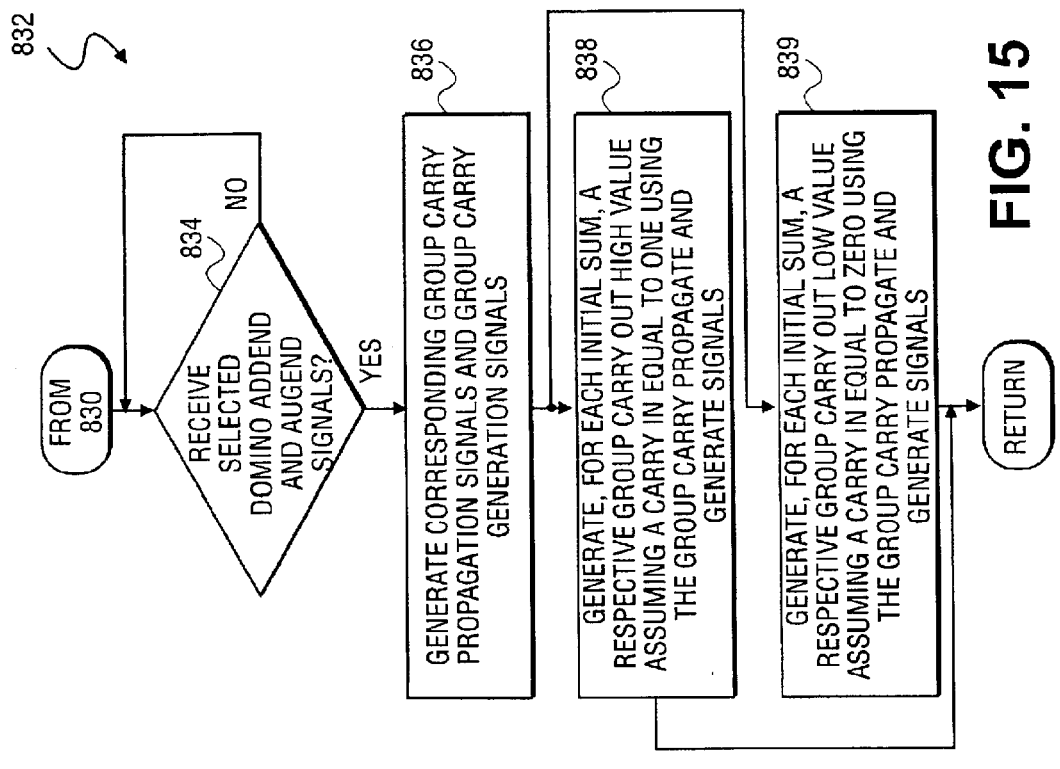
FIG. 15 depicts a flowchart illustrating an additional method for generating initial carry-out signals within a multi-purpose domino adder in accordance with a further embodiment of the present invention.

Referring now to FIG. 15, FIG. 15 depicts a flowchart illustrating an additional method 832 for generating an initial carry-out signal of process block 830, as depicted in FIG. 11. At process block 834, it is determined whether selected domino addend and augend signals are received. Once received, at process block 836, group PG generation block 622 (FIG. 8) will generate corresponding group carry propagation signals and group carry generation signals from received carry propagate and generate terms.

Next, at process block 838, the initial carry generation block 660 will generate, for each initial sum, a respective group carry-out high value, assuming a carry-in equal to one for the initial sum. Concurrently, at process block 839, the initial carry generation block 660 will generate for each initial sum a respective group carry-out low value, assuming a carry-in equal to zero for each initial sum. The various carry-out values are generated according to group propagate and generate terms received by the initial carry generation block. As will be described in further detail below, these carry-in values will be utilized in order to form intermediate sums by intermediate sum selection block 650 (FIG. 8).

Figure 16:
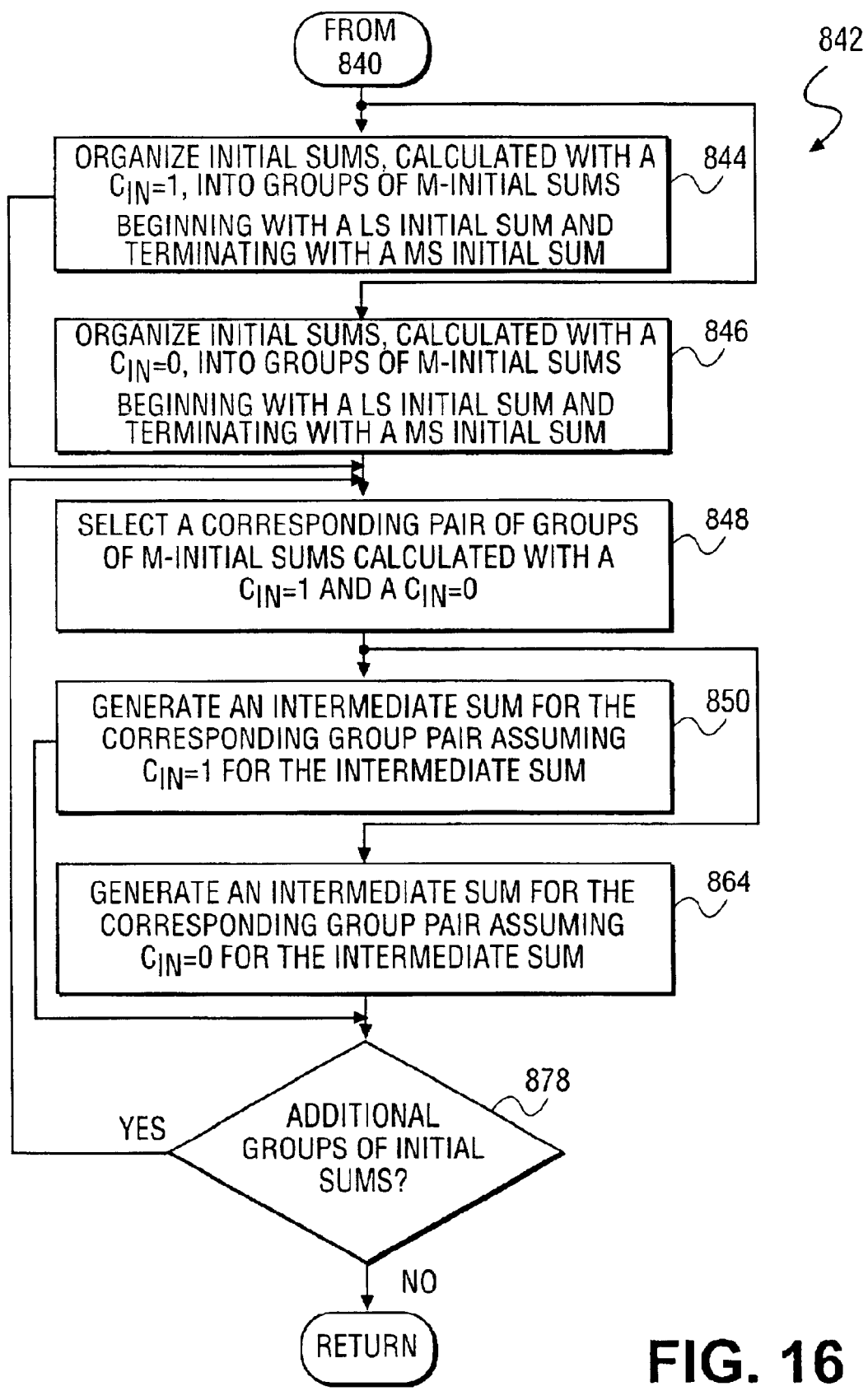
FIG. 16 depicts a flowchart illustrating an additional method for generating an intermediate sum within a multi-purpose domino adder in accordance with a further embodiment of the present invention.

Referring now to FIG. 16, FIG. 16 depicts a flowchart illustrating an additional method 842 for generating intermediate sums of process block 840, as depicted in FIG. 11. At process block 844, initial sums, calculated with a carry-in (Cin) equal to one are organized into groups of M-initial sums beginning with a least significant (LS) initial sum and terminating with a most significant (MS) initial sum. For example, as depicted in FIGS. 5A–5B, the initial sums (IniSum) are generated assuming a carry-in equal to one (IniSumH) or a carry-in equal to zero (IniSumL). As indicated, the least significant IniSum would be the rightmost sum (e.g., IniSumH, L [3:0] 412/414), while the most significant would be the left-most sum (e.g., IniSumH [15:12] 442 or IniSumL [15:12] 444).

Concurrently, a process block 846, initial sums are once again organized into groups of M-initial sums, beginning with a least significant initial sum and terminating with the most significant initial sum, assuming a carry-in equal to zero. As such, these values would refer to IniSumL [15:12] through IniSumL [3:0] and IniSumH [15:12] through InSumL [3:0]. Once organized, at process block 848, an intermediate sum selection block 650 would select corresponding pairs of groups of M-initial sums calculated with a carry-in equal to zero and a carry-in equal to one. As such, referring again to FIG. 5A, the respective values selected would be IniSumH [15:12] through IniSumH [3:0] for initial sums generated with a carry-in equal to one. In addition, corresponding initial sums IniSumL [15:12] through IniSumL [3:0] would be selected as corresponding pairs generated with a carry-in equal to zero.

Next, at process block 850, the intermediate sum selection block 650 will generate an intermediate sum for a corresponding group pair, assuming a carry-in equal to one for the intermediate sum. As such, referring again to FIG. 5A, an intermediate sum (IntSum), assuming a carry-in equal to one (IntSumH) would be generated. Concurrently, at process block 864, the intermediate sum generation block will generate an intermediate sum from the corresponding group pairs, assuming a carry-in equal to zero for the intermediate sum.

Accordingly, within a 72-bit adder, for example as depicted in FIG. 8, the "M" value would refer to 4 as the adder would be organized into 4 16-bit adders and 1 8-bit adder, as depicted in FIG. 5B. As such, within each 16-bit adder, there would be 4 IniSums from which to choose, as will be described in further detail below. Finally, at process block 878, process blocks 848–864 would be repeated for each corresponding group pair of initial sums. As such, within a 72-bit adder, this process would be repeated five times, assuming an organization as depicted in FIG. 5B.

Figure 17:
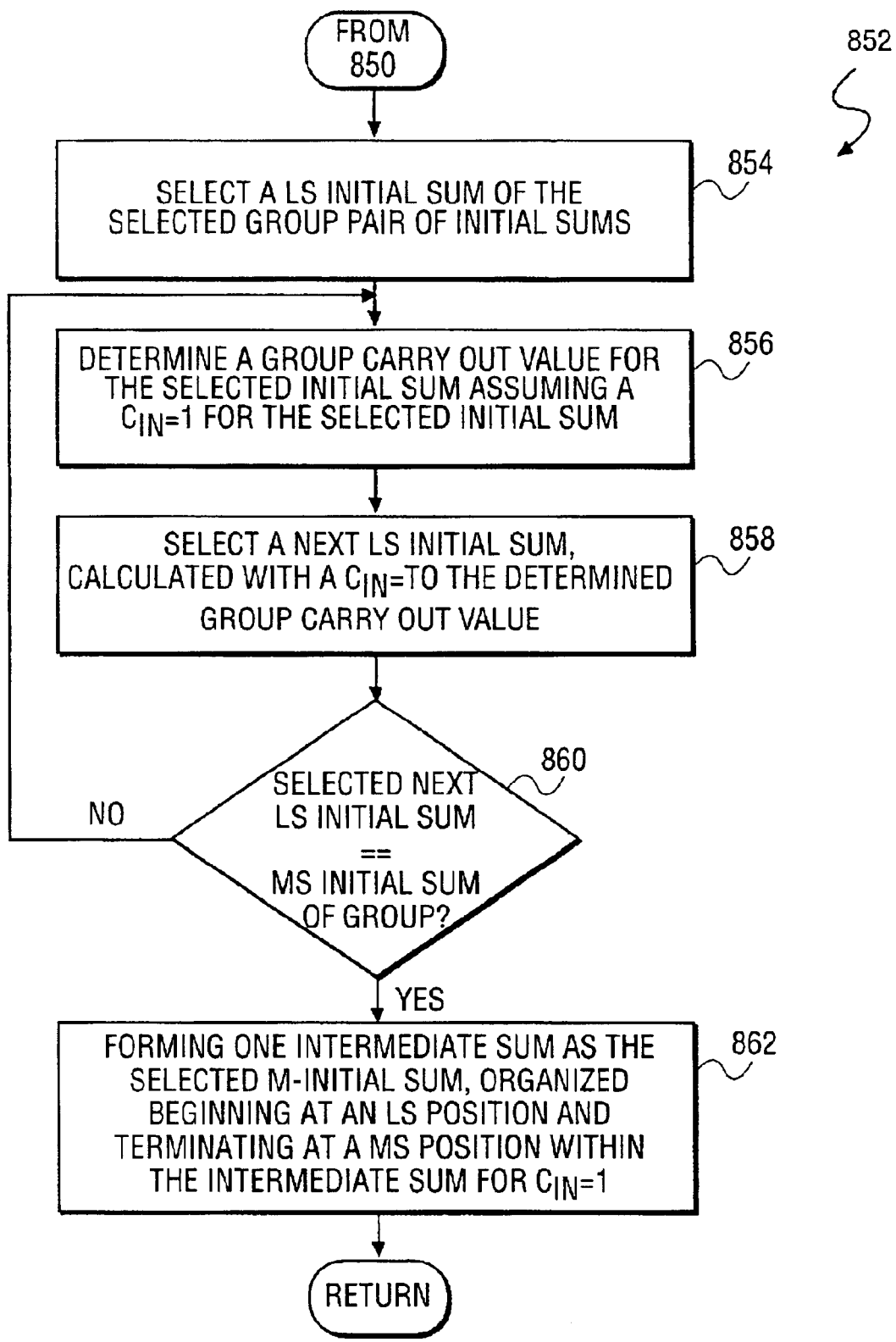
FIG. 17 depicts a flowchart illustrating an additional method for generating an intermediate sum assuming a carry-in value equal to one in accordance with an exemplary embodiment of the present invention.

Referring now to FIG. 17, FIG. 17 depicts a flowchart 852 illustrating an additional method 852 for generating an intermediate sum of process block 850, assuming a carry-in to the intermediate sum equal to one. Accordingly, referring to FIG. 5B, the adder 402 would generate an intermediate sum, assuming a carry-in value equal to zero (IntSumL) and a carry-in value equal to one (IntSumH). This process is illustrated in FIG. 5A. As such, at process block 854, the intermediate sum selection block 650 will select a least significant initial sum of the selected group pair of initial sums calculated with a carry-in equal to one.

As such, in the embodiment described, the initial group pair would refer to the initial sums generated by the 4-bit adders of the 16-bit adder 402 (See FIG. 5a). Accordingly, the intermediate selection block would select IniSumH [3:0], as IniSumH [3:0] is calculated by the 4-bit adder, assuming a carry-in value equal to one. Once formed, at process block 856, the initial carry selection block 660 will concurrently determine a group carry-out value for the selected initial sum of process block 854, which will be used as a carry-in value to a next least initial sum. Accordingly, the carry values will propagate along each of the adders, in parallel, to form a final sum, as described in further detail below.

Consequently, referring again to FIG. 5A, the initial carry select block 660 would generate a carry-out value for IniSumH [3:0]. Next, at process block 858, a next least significant initial sum is selected, which was calculated with a carry-in value equal to the previously determined group carry-out value of the least significant initial sum generated at process block 856. Accordingly, referring again to FIG. 5A, depending on the carry-out value IniSumH, the intermediate selection block 650 will select either IniSumH74 or IniSumL74, depending on the carry-out value.

Next, a process block 860, the intermediate sum selection block will determine whether the selected next least significant initial sum equals the most significant initial sum of the group. Accordingly, this process would occur until IniSumH1512 or IniSumL1512 are selected. Once selected, process block 862 is performed. Otherwise, process blocks 856 and 858 are repeated until the final term is selected. Finally, at process block 862, the intermediate sum is formed as the selected M-initial sums, organized beginning with a least significant position and terminating at a most significant position within the intermediate sum. Accordingly, the various IniSums are selected based on a carry-out value generated from a prior IniSum.

Figure 18:
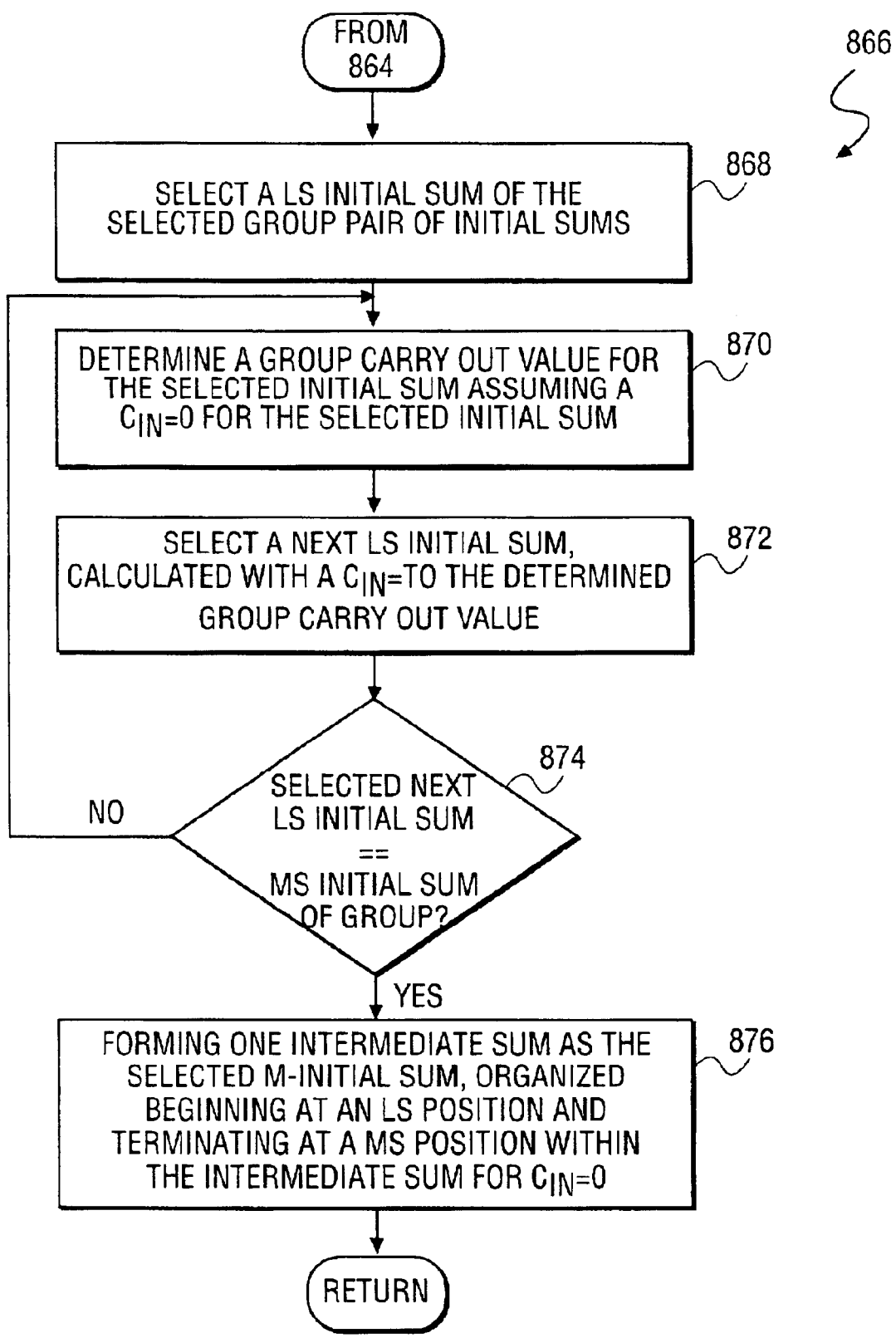
FIG. 18 depicts a flowchart illustrating an additional method for generating an intermediate sum within a multi-purpose domino adder, assuming a carry-in value equal to zero in accordance with a further exemplary embodiment of the present invention.

Referring now to FIG. 18, FIG. 18 depicts a flowchart illustrating an additional method 866 for generating an intermediate sum, assuming a carry-in equal to zero. Accordingly, the identical process of method 852 is repeated, however, this process assumes a carry-in equal to zero. As such, at process block 868, a least significant initial sum of the selected group pair of initial sums is selected. As depicted in FIG. 5A, this would refer to IniSum 30. Next, at process block 870, a group carry-out value for the selected initial sum is generated, assuming a carry-in equal to zero for the selected initial sum.

As such, a carry-out value would be determined for IniSumL. At process block 872, a next least significant initial sum is selected, which is calculated with a carry-in value equal to the determined group carry-out value of process block 870. Next, at process block 874, process blocks 870 and 872 are repeated until a selected next least significant initial sum equals a most significant initial group sum. As described above, this refers to IniSumH 1512 or IniSumL 1512.

Finally, at process block 876, the intermediate sum is formed as the selected M-initial sums organized beginning at a least significant position and terminating at a most significant position, with an intermediate sum for the carry-in equal to zero. Accordingly, as described above, this selection may be performed in parallel within each of the various adders of the 72-bit adder 600, with the various carry-out values generated along a critical path including the PG generation block 620, the group PG generation block 622, the initial carry selection block 660, as well as the intermediate carry block 670 and the final carry block 672.

Figure 19:
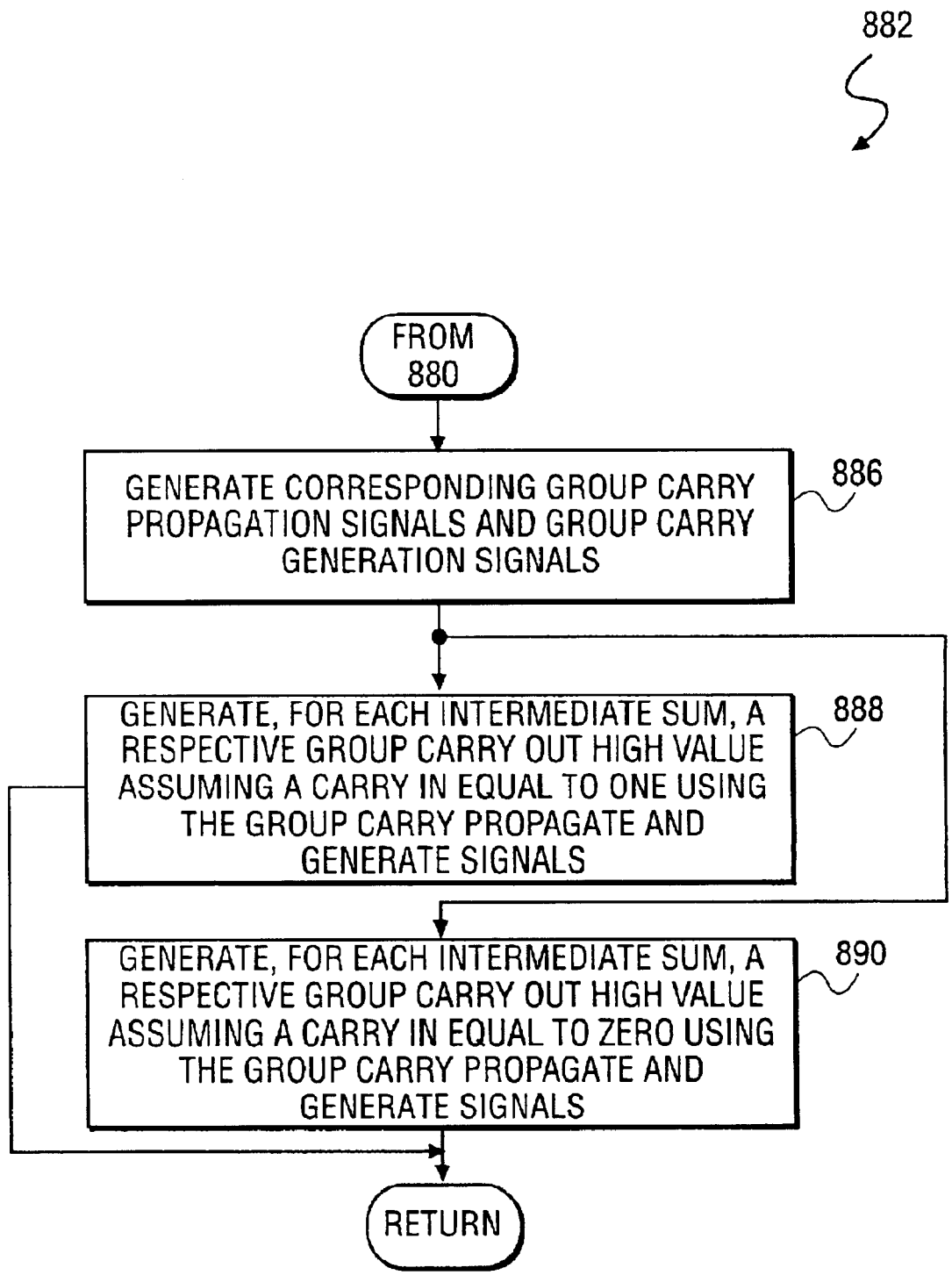
FIG. 19 depicts a flowchart illustrating an additional method for generating an intermediate carry-out value within a multi-purpose domino adder in accordance with a further embodiment of the present invention.

Referring now to FIG. 19, FIG. 19 depicts a flowchart illustrating an additional method 882 for generating an intermediate carry-out signal of process block 880, as depicted in FIG. 11. At process block 886, the intermediate carry block 670 (FIG. 8) will receive corresponding group carry propagation signals and group carry generation signals from the group PG generation block 622. Next, at process block 838, the intermediate carry generate block will generate, for each intermediate sum, a respective group carry-out high value, assuming a carry-in equal to one. Concurrently, at process block 890, the intermediate carry generation block 670 will generate for each intermediate sum, a respective group carry-out low value, assuming a carry-in equal to one. This process is performed using the received group propagate and generate term as well as equations 12–15, as described above.

Figure 20:
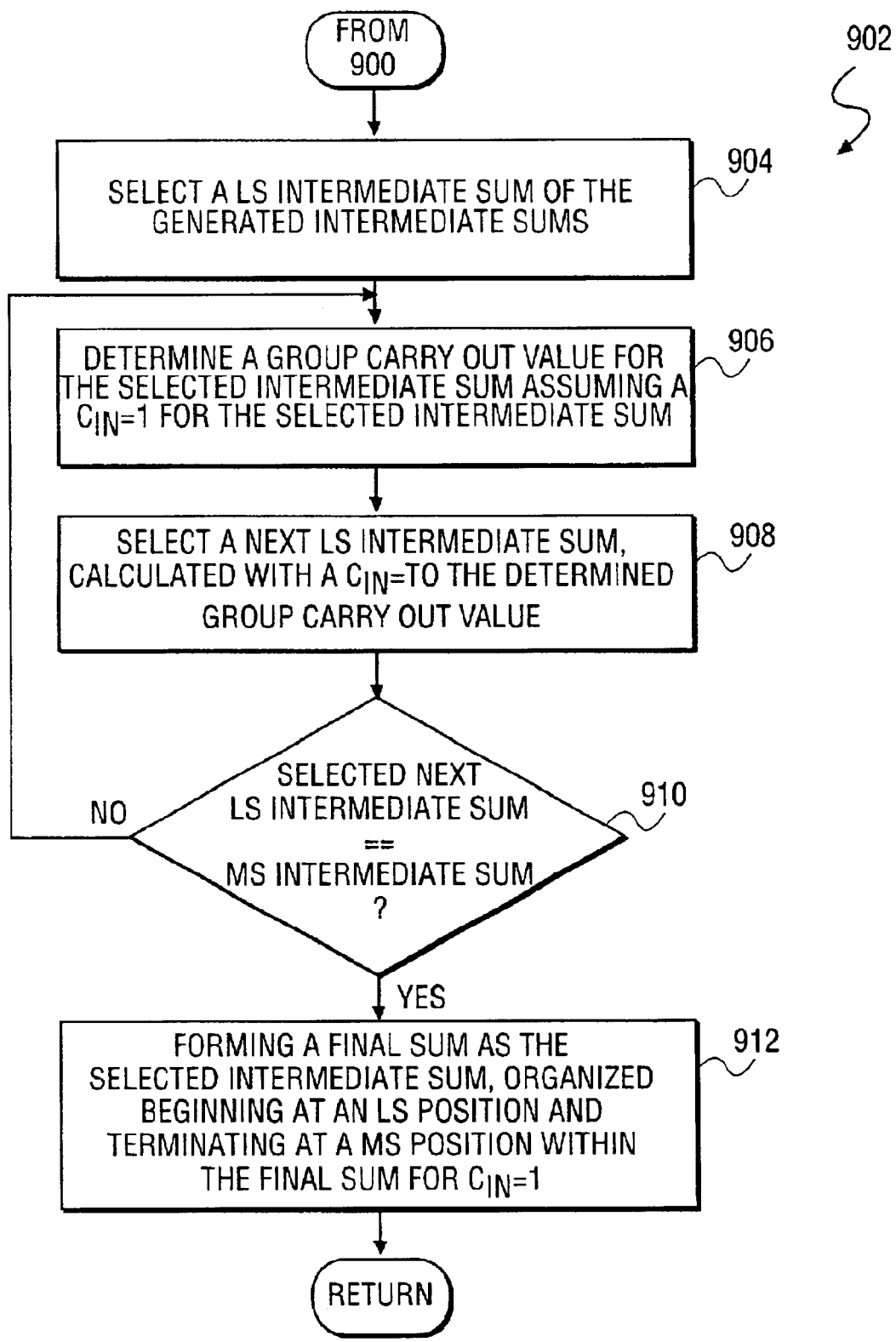
FIG. 20 depicts a flowchart illustrating an additional method for calculating a final sum value within a multi-purpose domino adder, assuming a carry-in value equal to one.

Referring now to FIG. 20, FIG. 20 depicts a flowchart illustrating an additional method 902 for calculating a final sum from the adder 600, for example as depicted in FIG. 8. At process block 904, a least significant intermediate sum of the various intermediate sums generated by the intermediate sum generation block 650 is selected, having a carry-in value equal to one. Next, at process block 906, a group carry-out value for the selected intermediate sum is determined, assuming a carry-in equal to one for the selected intermediate sum.

As such, at process block 908, a next least significant intermediate sum is selected, which is calculated with a carry-in value equal to the determined group carry-out value of the previously selected intermediate sum. Next, at process block 910, process blocks 906 and 908 are repeated until a selected next least significant intermediate sum equals a most significant intermediate sum generated by the intermediate generation block. Once this case proves true, process block 912 is performed. At process block 912, the final sum is formed as the selected intermediate sums organized beginning at a least significant position and terminating at a most significant position within the final sum, assuming a carry-in equal to one for the adder 600.

Accordingly, referring again to FIG. 5B, the various adders of the adder 600 will generate intermediate sums IntSum, assuming a carry-in equal to one IntSumH or a carry-in equal to zero IntSumL. As such, a least significant IntSum would refer to either IntSumH [15:0] or IntSumL [15:0]. Accordingly, the final sum output, assuming a carry-in equal to one ($FSum_{OUT}H$) would initially select IntSumH [15:0] as IntSumH [15:0] is a least significant initial sum, calculated with the carry-in equal to one. As such, a carry-out value of IntSumH would be determined and accordingly, either IntSumH [31:16] or IntSum [31:60] would be selected as a next least significant intermediate sum. As such, this process would continue until either IntSumH [71:64] or IntSumL [71:64] was selected as a most significant term of the final output sum $FSum_{OUT}H$. The identical process would be repeated for the final sum output assuming a carry-in equal to zero, which is now described with reference to FIG. 21.

Figure 21:
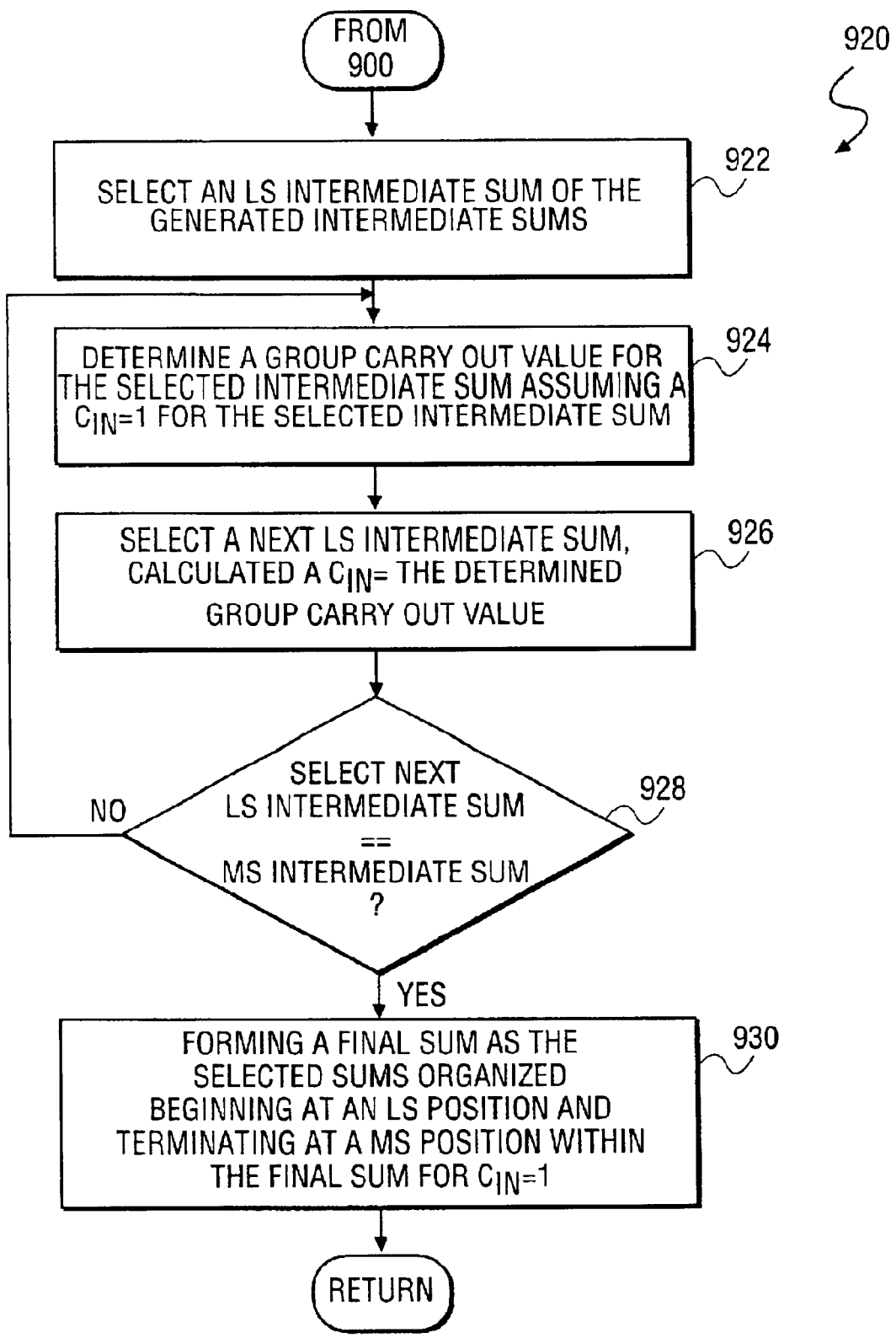
FIG. 21 depicts a flowchart illustrating an additional method for calculating a final sum by a multi-purpose domino adder, assuming a carry-in value equal to zero in accordance with an exemplary embodiment of the present invention.

As such, FIG. 21 depicts a flowchart 920 illustrating an additional method 920 for generating a final sum value for the adder 600, for example as depicted in FIG. 8. Accordingly, at process block 922, a final output selection block 690 will select a least significant intermediate sum generated by the intermediate sum selection block, having a carry-in value equal to zero. Next, at process block 924, a group carry-out value for the selected intermediate sum will be received from the intermediate carry generation block 670. Accordingly, at process block 858, the final sum outblock 690 will select a next least significant initial sum calculated with a carry-in value equal to the determined group carry-out value of process block 924.

Next, at process block 928, process block 924 and 926 will be repeated concurrently until the selected next least significant intermediate sum equals a most significant intermediate sum generated by the intermediate sum generation block 650. Once detected, at process block 930, a final sum output of the adder 600 will be formed as each of the selected intermediate sums are organized beginning at a least significant position and terminating at a most significant position, within the final sum output, assuming a carry-in equal to zero. As such, a final value of the adder may be calculated at a later time during a clock cycle. In addition, a final carry-out block 672 will also generate a final carry-out value of each of the final sums generated.

Alternate Embodiments

Several aspects of one implementation of the multi-mode domino adder for providing carry propagation via a critical domino path have been described. However, various implementations of the multi-mode domino adder provide numerous features including, complementing, supplementing, and/or replacing the features described above. Features can be implemented as part of the a standard or as part of a floating point unit in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to a multi-mode domino adder, it will be appreciated by those skilled in the art that the teaching of the present invention can be applied to other systems. In fact, systems for static input and static output sum, domino/static input and a domino/static output sum are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

The present invention provides many advantages over known techniques. The present invention includes a multi-purpose domino adder designed in the most efficient way by mixing both domino and static logic. Thus, it allows very simple interfaces, which are static inputs and outputs. The critical path is the carry-chain, requiring high speed propagation; therefore, domino logic calculates the carry chain in order to achieve better performance. The intermediate sum is not critical, so this path is implemented in static logic in order to reduce clock loading and power. The final sum is also implemented in static logic because its outputs are generally interfaced with static logic. The 16-bit blocks, 8-bit block and 4-bit sub-blocks are implemented in two different paths, one path with carry-in equal to is zero and the other path with carry-in equal to one. This design provides flexibility to the designer, such that a late carry-in may be used to select the outputs at a later stage of the clock cycle. This feature is integral to floating point units in order to incorporate the latency that may be architected in the adder and multiply/divider units.

This adder uses the principle of the Ling Adder to provide data faster propagation by eliminating one of the propagation terms in its carry chain. This adder is also designed so that it can be used as one 72-bit adder, two 28-bit adders or eight 8-bit adders. Regarding the two 32-bit adders, in order to use this adder as two 28-bit adders, one control signal is needed to indicate a 28-bit mode so the carry-out of bit 31 will not be propagated through the next 28-bit adder. Regarding the eight 8-bit adders, input data between 8-bit slices is set to zero.

Having disclosed exemplary embodiments, modifications and variations may be made to the disclosed embodiments while remaining within the scope of the invention as defined by the following claims.

What is claimed is:

1. A method comprising:
   calculating, via a static initial sum adder, an initial sum for each corresponding N-bit portion of a received addend signal and a received augend signal;
   concurrent with calculating initial sums, generating, via domino initial carry-out logic, an initial carry-out signal for each initial sum previously calculated by the static initial sum adder;
   calculating, via a static intermediate sum adder, an intermediate sum for each group of M-initial sums according to a respective initial carry-out value of each initial sum calculated by the static initial sum adder;
   concurrent with calculating intermediate sums, generating, via domino intermediate carry-out logic, an intermediate carry-out signal for each intermediate sum generated by the static intermediate sum adder; and
   calculating a final sum value from the calculated intermediate sums according to a respective intermediate carry-out of each intermediate sum previously calculated by the static intermediate sum adder.

2. The method of claim 1, wherein calculating initial sums further comprises:
   receiving a domino addend signal and a corresponding domino augend signal;
   converting the domino augend signal and the domino addend signals into a static addend signal and a static augend signal;
   providing the static augend and addend signals to the static sum adder;
   providing the domino augend and addend signals to a domino carry propagation block;
   generating, by the domino carry propagation/generation block, one of a carry propagation signal, a carry generation signal, a group carry generation signal and a group carry propagation signal according to the received domino augend and addend signals;
   providing the carry propagation signals and the carry generation signals to the domino initial carry-out logic; and
   providing the group carry generation signals and the group carry propagation signals to the domino intermediate carry-out logic.

3. The method of claim 1, wherein calculating the initial sums further comprises:
   selecting corresponding N-bit portions of the addend signal and the augend signal;
   calculating an initial sum of the selected corresponding N-bit portions of the addend and augend signals, assuming a carry-in equal to one;
   concurrently calculating an initial sum of the selected corresponding N-bit portions of the addend and augend signal portions, assuming a carry-in equal to zero; and
   repeating the selecting, calculating and calculating for each N-bit portion of the addend and augend signals.

4. The method of claim 1, wherein generating initial carry-out signals further comprises:
   receiving a domino augend signal and a domino addend signal;
   receiving corresponding group carry propagation signals and group carry generation signals;
   generating, for each initial sum generated by the static sum adder, a respective group carry-out HIGH value as an initial carry-out signal, assuming a carry-in equal to one for the respective initial sum, using the received domino group carry propagation and generation signals; and
   concurrently generating, for each initial sum generated by the static sum adder, a respective group carry-out LOW signal value as an initial carry-out signal, assuming a carry-in equal to zero for each respective initial sum, using the received carry propagation and group carry generation signals.

5. The method of claim 1, wherein calculating an intermediate sum further comprises:
   organizing initial sums, calculated with a carry-in equal to one, into groups of M-initial sums, beginning with a least significant initial sum and terminating with a most significant initial sum;
   concurrently organizing initial sums, calculated with a carry-in equal to zero, into groups of M-initial sums beginning with a least significant initial sum and terminating with a most significant initial sum;
   selecting a corresponding group pair of M-initial sums calculated with a carry-in value equal to zero and a carry-in value equal to one;
   generating an intermediate sum of the corresponding group pair of initial sums, assuming an initial carry-in equal to one;
   concurrently generating an intermediate sum from the selected corresponding group pair of initial sums assuming a carry-in equal to zero; and
   repeating the selecting, generating and generating for each corresponding group pair of M-static initial sums.

6. The method of claim 5, wherein generating an intermediate sum, assuming a carry-in equal to one, further comprises:
   selecting a least significant initial sum from the selected group pair of initial sums;
   determining a group carry-out value for the selected initial sum assuming a carry-in equal to one;
   selecting a next least significant initial sum, calculated with a carry-in value equal to the determined carry-out value of the selected initial sum;
   repeating the determining and selecting until the selected next least significant initial sum is a most significant initial sum of one of the selected group pairs of M-initial sums; and forming an intermediate sum as the selected initial sums, assuming a carry-in equal to one for the intermediate sum.

7. The method of claim 5, wherein generating an intermediate sum, assuming a carry-in equal to zero, further comprises:

selecting a least significant initial sum from the selected group pair of initial sums, calculated with the carry-in equal to zero;

determining, by the domino intermediate carry-out logic, a carry-out value for the selected initial sum;

selecting a next least significant initial sum, calculated with a carry-in value equal to the determined carry-out value of the selected initial sum;

repeating the determining and selecting until the selected next least significant initial sum is a most significant local sum of one of the selected group pairs of M-initial sums; and forming an intermediate sum as the selected initial sums, assuming a carry-in equal to zero for the intermediate sum.

8. The method of claim 1, wherein generating an intermediate carry-out further comprises:

receiving a domino augend signal and a domino addend signal;

receiving corresponding group carry propagation signals and group carry generation signals;

generating, for each intermediate sum generated by the static intermediate sum adder, a respective group carry-out HIGH value, assuming a carry-in equal to one for the respective intermediate sum, using the received domino group carry generation and propagation signals; and concurrently generating, for each intermediate sum generated by the static intermediate sum adder, a respective group carry-out signal LOW value, assuming a carry-in equal to zero for each respective intermediate sum using the group carry generation and propagation signals.

9. The method of claim 1, wherein calculating a final sum further comprises:

selecting a least significant intermediate sum generated by the static intermediate sum adder, calculated with the carry-in equal to one;

determining a group carry-out HIGH value for the selected intermediate sum;

selecting a next least significant intermediate sum, calculated with a carry-in value equal to the determined group carry-out high value of the selected intermediate sum;

repeating the determining and selecting until the selected next least significant intermediate sum is a most significant intermediate sum of intermediate sums generated by the static intermediate sum adder; and forming a final sum as the selected intermediate sums, assuming a carry-in equal to one for the final sum.

10. The method of claim 1, wherein calculating a final value further comprises:

selecting a least significant intermediate sum from the intermediate sums, calculated by the intermediate sum adder, with the carry-in equal to zero;

determining, by the domino intermediate carry-out logic, a carry-out LOW value for the selected intermediate sum;

selecting a next least significant intermediate sum, calculated with a carry-in value equal to the determined carry-out LOW value of the selected intermediate sum;

repeating the determining and selecting until the selected next least significant intermediate sum is a most significant intermediate sum of intermediate sums generated by the static intermediate sum adder; and forming a final sum as the selected intermediate sums, assuming a carry-in equal to zero for the final sum.

11. The method of claim 1, wherein calculating an initial sum further comprises:

calculating an N-bit half-add sum of each corresponding bit pair of the received addend and augend signals;

receiving an internal carry-out signal for internal bits of each N-bit half-add sum from domino internal carry generation logic; and calculating a second N-bit half-add sum of the received internal carry signals and corresponding N-bit half-add sums in order to form each of the N-bit initial sums.

12. A computer readable storage medium including program instructions that direct a computer to function in a specified manner when executed by a processor, the program instructions comprising:

calculating, via a static initial sum adder, an initial sum for each corresponding N-bit portion of a received addend signal and a received augend signal;

concurrent with calculating initial sums, generating, via domino initial carry-out logic, an initial carry-out signal for each initial sum previously calculated by the static initial sum adder;

calculating, via a static intermediate sum adder, an intermediate sum for each group of M-initial sums according to a respective initial carry-out value of each initial sum calculated by the static initial sum adder;

concurrent with calculating intermediate sums, generating, via domino intermediate carry-out logic, an intermediate carry-out signal for each intermediate sum generated by the static intermediate sum adder; and calculating a final sum value from the calculated intermediate sums according to a respective intermediate carry-out of each intermediate sum previously calculated by the static intermediate sum adder.

13. The computer readable storage medium of claim 12, wherein calculating initial sums further comprises:

receiving a domino addend signal and a corresponding domino augend signal;

converting the domino augend signal and the domino addend signals into a static addend signal and a static augend signal;

providing the static augend and addend signals to the static sum adder;

providing the domino augend and addend signals to a domino carry propagation block;

generating, by the domino carry propagation/generation block, one of a carry propagation signal, a carry generation signal, a group carry generation signal and a group carry propagation signal according to the received domino augend and addend signals;

providing the carry propagation signals and the carry generation signals to the domino initial carry-out logic; and providing the group carry generation signals and the group carry propagation signals to the domino intermediate carry-out logic.

14. The computer readable storage medium of claim 12, wherein calculating the initial static sums further comprises:
  selecting corresponding N-bit portions of the addend signal and the augend signal;
  calculating an initial sum of the selected corresponding N-bit portions of the addend and augend signals, assuming a carry-in equal to one;
  concurrently calculating an initial sum of the selected corresponding N-bit portions of the addend and augend signal portions, assuming a carry-in equal to zero; and
  repeating the selecting, calculating and calculating for each N-bit portion of the addend and augend signals.

15. The computer readable storage medium of claim 12, wherein generating initial carry-out signals further comprises:
  receiving a domino augend signal and a domino addend signal;
  receiving corresponding group carry propagation signals and group carry generation signals;
  generating, for each initial sum generated by the static sum adder, a respective group carry-out high value as an initial carry-out signal, assuming a carry-in equal to one for the respective initial sum, using the received domino group carry propagation and group carry generation; and
  concurrently generating, for each initial sum generated by the static initial sum adder, a respective group carry-out LOW signal value, assuming a carry-in equal to zero for each respective initial sum, using the received carry propagation and group carry generation signals.

16. The computer readable storage medium of claim 12, wherein calculating an intermediate sum further comprises:
  organizing initial sums, calculated with a carry-in equal to one, into groups of M-initial sums, beginning with a least significant initial sum and terminating with a most significant initial sum;
  concurrently organizing initial sums, calculated with a carry-in equal to zero, into groups of M-initial sums beginning with a least significant initial sum and terminating with a most significant initial sum;
  selecting a corresponding group pair of M-initial sums calculated with a carry-in value equal to zero and a carry-in value equal to one;
  generating an intermediate sum of the corresponding group pair of initial sums, assuming an initial carry-in equal to one;
  concurrently generating an intermediate sum from the selected corresponding group pair of initial sums assuming a carry-in equal to zero; and
  repeating the selecting, generating and generating for each corresponding group pair of M-static initial sums.

17. The computer readable storage medium of claim 16, wherein generating an intermediate sum, assuming a carry-in equal to one, further comprises:
  selecting a least significant initial sum from the selected group pair of initial sums;
  determining a group carry-out value for the selected initial sum assuming a carry-in equal to one;
  selecting a next least significant initial sum, calculated with a carry-in value equal to the determined carry-out value of the selected initial sum;
  repeating the determining and selecting until the selected next least significant initial sum is a most significant initial sum of one of the selected group pairs of M-initial sums; and
  forming an intermediate sum as the selected initial sums, assuming a carry-in equal to one for the intermediate sum.

18. The computer readable storage medium of claim 16, wherein generating an intermediate sum, assuming a carry-in equal to zero, further comprises:
  selecting a least significant initial sum from the selected group pair of initial sums, calculated with the carry-in equal to zero;
  determining, by the domino intermediate carry-out logic, a carry-out value for the selected initial sum;
  selecting a next least significant initial sum, calculated with a carry-in value equal to the determined carry-out value of the selected initial sum;
  repeating the determining and selecting until the selected next least significant initial sum is a most significant local sum of one of the selected group pairs of M-initial sums; and
  forming an intermediate sum as the selected initial sums, assuming a carry-in equal to zero for the intermediate sum.

19. The computer readable storage medium of claim 12, wherein generating an intermediate carry-out further comprises:
  receiving a domino augend signal and a domino addend signal;
  receiving corresponding group carry propagation signals and group carry generation signals;
  generating, for each intermediate sum generated by the static intermediate sum adder, a respective group carry-out HIGH value, assuming a carry-in equal to one for the respective intermediate sum, using the received domino group carry generation and propagation signals; and
  concurrently generating, for each intermediate sum generated by the static intermediate sum adder, a respective group carry-out signal LOW value, assuming a carry-in equal to zero for each respective intermediate sum using the group carry generation and propagation signals.

20. The computer readable storage medium of claim 12, wherein calculating a final sum further comprises:
  selecting a least significant intermediate sum generated by the static intermediate sum adder, calculated with the carry-in equal to one;
  determining a group carry-out high value for the selected intermediate sum;
  selecting a next least significant intermediate sum, calculated with a carry-in value equal to the determined group carry-out high value of the selected intermediate sum;
  repeating the determining and selecting until the selected next least significant intermediate sum is a most significant intermediate sum of intermediate sums generated by the static intermediate sum adder; and
  forming a final sum as the selected intermediate sums, assuming a carry-in equal to one for the final sum.

21. The computer readable storage medium of claim 12, wherein calculating a final value further comprises:
  selecting a least significant intermediate sum from the intermediate sums, calculated by the intermediate sum adder, with the carry-in equal to zero;
  determining, by the domino intermediate carry-out logic, a carry-out low value for the selected intermediate sum;

selecting a next least significant intermediate sum, calculated with a carry-in value equal to the determined carry-out LOW value of the selected intermediate sum;

repeating the determining and selecting until the selected next least significant intermediate sum is a most significant intermediate sum of intermediate sums generated by the static intermediate sum adder; and forming a final sum as the selected intermediate sums, assuming a carry-in equal to zero for the final sum.

22. The computer readable storage medium of claim 12, wherein calculating an initial sum further comprises:

calculating an N-bit half-add sum of each corresponding bit pair of the received addend and augend signals;

receiving an internal carry-out signal for internal bits of each N-bit half-add sum from domino internal carry generation logic; and calculating a second N-bit half-add sum of the received internal carry signals and corresponding N-bit half-add sums in order to form each of the N-bit initial sums.

23. An adder, comprising:

a processor having circuitry to execute instructions;

an input selection device coupled to the processor, the input selection device to receive a plurality of corresponding addend and augend signal;

a domino carry propagation/generation circuit to generate one of carry propagation signals, carry generation signals, group carry generation signals and group carry propagation signals, according to received domino augend signal and a received domino addend signal;

a static half sum adder to generate half-add sums of each corresponding N-bit portions of the received augend signals and the received addend signals; and a storage device coupled to the processor, having sequences of instructions stored therein, which when executed by the processor, cause the processor to:

calculate an initial sum for each N-bit portion half-add sum utilizing corresponding carry generation and carry propagation signals, concurrent with calculation of initial sums, generate a carry-out signal for each calculated initial sum utilizing corresponding group carry propagation signals and group carry generation signals, select an intermediate sum for each group of M-initial sums according to a respective carry-out value of each previously calculated initial sum, concurrent with selection of intermediate sums, generate an intermediate carry-out for each generated intermediate sum, and select a final sum value from the calculated intermediate sums according to a respective carry-out of each previously generated intermediate sum.

24. The adder of claim 23, further comprising:

a domino internal carry generation circuit to generate internal carry-out signals for internal bits of each half-add sum utilizing received carry propagation and carry generation signals.

25. The adder of claim 23, further comprising:

a domino initial carry generation circuit to generate, for each initial sum, an initial group carry out value assuming a carry-in of one and a carry-in of zero utilizing received group carry propagate and generate signals.

26. The adder of claim 23, further comprising:

a domino intermediate carry generation circuit to generate, for each intermediate sum, an intermediate group carry out value assuming a carry-in of one and a carry-in of zero utilizing received group carry propagate and generate signals.

27. The adder of claim 23, further comprising:

a mode selection circuit to receive a mode selection signal and direct the apparatus to function in one of a 72-bit adder mode, a two 28-bit adder mode and an eight 8-bit adder mode.

28. An electronic system comprising:

a printed wiring board on which a parallel bus is formed, an integrated circuit (IC) chip package being operatively installed on the board to communicate using the parallel bus, the package having an IC chip that includes a logic function section and an I/O section as an interface between the logic function section and the bus, the logic function section includes a domino adder in which a static sum calculation path includes initial sum calculation logic, intermediate sum selection logic and final sum selection logic and a domino carry-chain generation path that includes carry propagate/generate logic, initial carry generation logic and intermediate carry generation logic; and wherein, the initial sum calculation block receives static input addend and augend signals, while the carry propagate/generate logic receives domino addend and augend signals to generate group propagate/generate terms and an initial carry-in for the sum calculation block to generate initial N-bit sums provided to the intermediate sum selection block to select groups of M-initial sums to form intermediate sums in response to initial carry-in signals generated by the initial carry generation logic in response to the group propagate/generate terms, the final sum selection logic to select received intermediate sums, in response to intermediate carry-in signals generated by the intermediate carry generation logic in response to the group propagate/generate terms, to form a final sum of the received addend and augend signals assuming a carry-in equal to one and a carry-in equal to zero.

29. The electronic system of claim 28, wherein the logic function section is a microprocessor.

30. The electronic system of claim 28, wherein the logic function section is a floating point unit.

31. The electronic system of claim 28, wherein the logic function section is an arithmetic logic unit.

* * * * *

UNITED STATES PATENT AND TRADEMARK OFFICE
CERTIFICATE OF CORRECTION

PATENT NO. : 6,839,729 B2
DATED : January 4, 2005
INVENTOR(S) : Pham

It is certified that error appears in the above-identified patent and that said Letters Patent is hereby corrected as shown below:

Column 11,
Line 17, delete "ggs_$_{30\text{-}}$.", and insert -- ggs_30= --.

Column 14,
Line 15, after " follows:", insert
-- p31→high
   gps31_0→ high (To ensure that the carry-in high is propagated)
   both sources of bit 31 are zeroes →Cout32Lo="0"
   Accordingly, the adder 600 (Fig.8) can be used for both modes by setting certain results in Vx mode. --

Signed and Sealed this

Tenth Day of May, 2005

JON W. DUDAS
*Director of the United States Patent and Trademark Office*